United States Patent
Sun et al.

(10) Patent No.: US 11,934,280 B2
(45) Date of Patent: *Mar. 19, 2024

(54) USE OF CLUSTER-LEVEL REDUNDANCY WITHIN A CLUSTER OF A DISTRIBUTED STORAGE MANAGEMENT SYSTEM TO ADDRESS NODE-LEVEL ERRORS

(71) Applicant: NetApp, Inc., San Jose, CA (US)

(72) Inventors: Wei Sun, Boulder, CO (US); Anil Paul Thoppil, Pleasanton, CA (US); Anne Maria Vasu, Erie, CO (US)

(73) Assignee: NetApp, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/680,631

(22) Filed: Feb. 25, 2022

(65) Prior Publication Data
US 2023/0152986 A1 May 18, 2023

Related U.S. Application Data

(60) Provisional application No. 63/279,892, filed on Nov. 16, 2021.

(51) Int. Cl.
*G06F 3/06* (2006.01)
*G06F 11/10* (2006.01)
(Continued)

(52) U.S. Cl.
CPC ........ *G06F 11/1662* (2013.01); *G06F 3/0622* (2013.01); *G06F 3/064* (2013.01);
(Continued)

(58) Field of Classification Search
CPC .... G06F 11/1662; G06F 3/0622; G06F 3/064; G06F 3/0679; G06F 11/1088;
(Continued)

(56) References Cited

U.S. PATENT DOCUMENTS 7,171,484 B1 1/2007 Krause et al.
7,409,511 B2 8/2008 Edwards et al.
(Continued)

FOREIGN PATENT DOCUMENTS

CN 106844089 B 1/2021

OTHER PUBLICATIONS

Containers as a service. Bring data rich enterprise applications to your Kubernetes platform [online]. Portworx, Inc. 2021, 8 pages [retrieved on Nov. 9, 2021]. Retrieved from the Internet: ">">https://portworx.com/containers-as-a-service/.
(Continued)

*Primary Examiner* — Francisco A Grullon
(74) *Attorney, Agent, or Firm* — Jaffery Watson Mendonsa & Hamilton LLP

(57) ABSTRACT

Systems and methods that make use of cluster-level redundancy within a distributed storage management system to address various node-level error scenarios are provided. Rather than using a generalized one-size-fits-all approach to reduce complexity, an approach tailored to the node-level error scenario at issue may be performed to avoid doing more than necessary. According to one embodiment, responsive to identifying a missing branch of a tree implemented by a KV store of a first node of a cluster of a distributed storage management system, a branch resynchronization process may be performed, including, for each block ID in the range of block IDs of the missing branch (i) reading a data block corresponding to the block ID from a second node of the cluster that maintains redundant information relating to the block ID; and (ii) restoring the block ID within the KV store by writing the data block to the first node.

22 Claims, 20 Drawing Sheets

(51) Int. Cl.
  *G06F 11/16* (2006.01)
  *G06F 11/30* (2006.01)
  *G06F 16/27* (2019.01)
(52) U.S. Cl.
  CPC ........ *G06F 3/0679* (2013.01); *G06F 11/1088* (2013.01); *G06F 11/3034* (2013.01); *G06F 16/27* (2019.01)
(58) Field of Classification Search
  CPC .... G06F 11/3034; G06F 16/27; G06F 3/0619; G06F 3/067; G06F 11/1076; G06F 11/1092; G06F 11/2094
  See application file for complete search history.

(56) References Cited

U.S. PATENT DOCUMENTS

| | | | |
|---|---|---|---|
| 7,958,168 | B2 | 6/2011 | Chen et al. |
| 7,979,402 | B1 | 7/2011 | Hamilton et al. |
| 8,086,603 | B2 | 12/2011 | Nasre et al. |
| 8,560,879 | B1 | 10/2013 | Goel |
| 8,671,265 | B2 | 3/2014 | Wright |
| 8,706,701 | B1 | 4/2014 | Stefanov et al. |
| 8,903,761 | B1 | 12/2014 | Zayas et al. |
| 8,903,830 | B2 | 12/2014 | Edwards |
| 9,003,021 | B2 | 4/2015 | Wright et al. |
| 9,626,398 | B2 * | 4/2017 | Graefe ................ G06F 16/2246 |
| 9,634,992 | B1 | 4/2017 | Rostamabadi et al. |
| 10,133,511 | B2 | 11/2018 | Muth et al. |
| 10,846,301 | B1 | 11/2020 | Jia et al. |
| 11,036,420 | B2 | 6/2021 | Thoppil et al. |
| 11,048,430 | B2 | 6/2021 | Thoppil et al. |
| 11,169,707 | B2 | 11/2021 | Blount |
| 11,210,013 | B2 | 12/2021 | Thoppil et al. |
| 11,675,697 | B2 | 6/2023 | Fukutomi et al. |
| 2008/0154852 | A1 | 6/2008 | Beyer et al. |
| 2013/0091110 | A1 | 4/2013 | Katz et al. |
| 2013/0227145 | A1 | 8/2013 | Wright et al. |
| 2013/0246580 | A1 | 9/2013 | Ozawa et al. |
| 2013/0318126 | A1 * | 11/2013 | Graefe ................ G06F 16/2246 707/E17.012 |
| 2014/0250323 | A1 | 9/2014 | Joshi et al. |
| 2015/0220528 | A1 | 8/2015 | Huang et al. |
| 2015/0244795 | A1 | 8/2015 | Cantwell et al. |
| 2015/0309746 | A1 | 10/2015 | Fornander et al. |
| 2017/0124138 | A1 | 5/2017 | Mandagere et al. |
| 2018/0074898 | A1 | 3/2018 | Wang et al. |
| 2019/0138517 | A1 | 5/2019 | Blount et al. |
| 2019/0294990 | A1 | 9/2019 | Lopez De Prado |
| 2020/0042388 | A1 | 2/2020 | Roberts |
| 2020/0097404 | A1 | 3/2020 | Cason |
| 2020/0117362 | A1 | 4/2020 | McCarthy et al. |
| 2020/0117372 | A1 | 4/2020 | Corey et al. |
| 2020/0159668 | A1 | 5/2020 | Chae |
| 2020/0183951 | A1 | 6/2020 | Mittal et al. |
| 2020/0250084 | A1 | 8/2020 | Stephens et al. |
| 2020/0250148 | A1 | 8/2020 | Dayan et al. |
| 2020/0285616 | A1 | 9/2020 | George et al. |
| 2020/0327050 | A1 | 10/2020 | Danilov et al. |
| 2020/0387308 | A1 | 12/2020 | Volkov et al. |
| 2020/0401515 | A1 | 12/2020 | Liang et al. |
| 2021/0334160 | A1 | 10/2021 | Mishra et al. |
| 2021/0334208 | A1 | 10/2021 | Proulx et al. |
| 2021/0334241 | A1 | 10/2021 | McCarthy et al. |
| 2021/0334409 | A1 * | 10/2021 | Weintraub ............... G06F 21/64 |
| 2022/0138046 | A1 | 5/2022 | Zhang et al. |
| 2022/0335027 | A1 * | 10/2022 | Subramanian Seshadri ................ G06F 16/128 |
| 2023/0153213 | A1 | 5/2023 | Sun et al. |
| 2023/0153214 | A1 * | 5/2023 | Sun .................... G06F 11/1092 714/3 |

OTHER PUBLICATIONS

Containers vs. Microservices: What's The Difference? [online]. BMC, 2021, 19 pages [retrieved on Nov. 9, 2021]. Retrieved from the Internet: ">" title="Link: https://www.bmc.com/blogs/containers-vs-microservices/>">https://www.bmc.com/blogs/containers-vs-microservices/.
Docker vs Virtual Machines (VMs) : A Practical Guide to Docker Containers and VMs [online]. Jan. 16, 2020. Weaveworks, 2021, 8 pages [retrieved on Nov. 9, 2021]. Retrieved from the Internet: ">" title="Link: https://www.weave.works/blog/a-practical-guide-to-choosing-between-docker-containers-and-vms>">https://www.weave.works/blog/a-practical-guide-to-choosing-between-docker-containers-and-vms.
How to orchestrate the modern cloud with Kubernetes [online]. Accenture, 2021, 7 pages [retrieved on Nov. 9, 2021]. Retrieved from the Internet: ">">https://www.accenture.com/us-en/blogs/software-engineering-blog/kralj-orchestrate-modern-cloud-kubernetes.
International Search Report and Written Opinion for Application No. PCT/US2021/028657 dated May 13, 2021, 13 pages.
Joshi A., "From there to here, from here to there, Containers are everywhere!," Dec. 16, 2020 [online], Nutanix. Dev, 2021, 14 pages [retrieved on Nov. 9, 2021], Retrieved from the Internet: URL: "title=Link: https://www.nutanix.dev/2020/12/16/from-there-to-here-from-here-to-there-containers-are-everywhere/>">https://www.nutanix.dev/2020/12/16/from-there-to-here-from-here-to-there-containers-are-everywhere/.
Karbon Kubernetes Orchestration. Management Made Simple. [online]. Nutanix, 2021, 12 pages [retrieved on Nov. 9, 2021]. Retrieved from the Internet: ">">https://www.nutanix.com/products/karbon.
NetApp SolidFire Element OS User Guide for Element OS Version 10.0, Sep. 2017, 215-12504_A0, 160 pages.
ONTAP 9, Concepts, Jun. 2021, 215-11959_2021-06_en-us, 38 pages.
ONTAP 9, Disks and Aggregates Power Guide, Jul. 2021, 215-11204_2021-07_en-us, 54 pages.
ONTAP 9, Replication between NetApp Element Software and ONTAP, May 2021, 215-12645_2021-05_en-us, 23 pages.
ONTAP 9, System Administration Reference, Jul. 2021, 15-11148_2021-07_en-us, 150 pages.
Pods [online]. Kubernetes, 2021, 6 pages [retrieved on Nov. 9, 2021]. Retrieved from the Internet: ">">https://kubernetes.io/docs/concepts/workloads/pods/.
Portworx Data Services, the complete solution for deploying production-grade data services on Kubernetes. [online]. Portworx, Inc. 2021, 5 pages [retrieved on Nov. 9, 2021]. Retrieved from the Internet: ">">https://portworx.com/products/portworx-data-services/.
Portworx Enterprise is the complete Kubernetes Storage Platform Trusted in Production by the Global 2000 [online]. Portworx, Inc. 2021, 10 pages [retrieved on Nov. 9, 2021]. Retrieved from the Internet: ">">https://portworx.com/products/portworx-enterprise/.
Sanglaji M., et al., "Nutanix Karbon: Enterprise-grade Kubernetes Solution," Nov. 28, 2018, 5 pages [online]. [retrieved on Nov. 9, 2021]. Retrieved from the Internet: >https://www.nutanix.com/blog/nutanix-karbon-enterprise-grade-kubernetes-solution.
Screen captures from YouTube video clip entitled "Pure Storage Portworx Deep Dive," 5 pages, uploaded on Nov. 6, 2020 by user "Tech Field Day". Retrieved from the Internet: >https://www.youtube.com/watch?v=WTCI98RAbZg.
Software Defined Storage (SDS) Solutions. [online]. Trustradius, 2021, 14 pages [retrieved on Nov. 9, 2021]. Retrieved from the Internet: ">">https://www.trustradius.com/software-defined-storage-sds.
Software-defined storage. [online] IBM, 2021, 12 pages [retrieved on Nov. 9, 2021]. Retrieved from the Internet: ">">https://www.ibm.com/it-infrastructure/software-defined-storage.
Solution Brief. Easily Operate a Database-as-a-Service Platform. [online]. Portworx, Inc. 2021, 2 pages [retrieved on Nov. 9, 2021]. Retrieved from the Internet: ">">https://portworx.com/wp-content/uploads/2021/09/pds-solution-brief.pdf.
URL: https://kubernetes.io/.
What Is Container Orchestration, Exactly? Everything to Know [online]. LaunchDarkly, Apr. 28, 2021, 8 pages [retrieved on Nov.

(56) References Cited

OTHER PUBLICATIONS 9, 2021] . Retrieved from the Internet: ">">https://launchdarkly. com/blog/what-is-container-orchestration-exactly-everything/.

What is Container Orchestration? [online]. CapitalOne, 2021, 8 pages [retrieved on Nov. 9, 2021]. Retrieved from the Internet: ">" title="Link: https://www.capitalone.com/tech/cloud/what-is-container-orchestration/>">https://www.capitalone.com/tech/cloud/what-is-container-orchestration/.

Non-Final Office Action dated Jun. 23, 2023 for U.S. Appl. No. 17/680,621, filed Feb. 25, 2022, 10 pages.

Notice of Allowance dated Jul. 31, 2023 for U.S. Appl. No. 17/680,653, filed Feb. 25, 2022, 09 pages.

Notice of Allowance dated Dec. 18, 2023 for U.S. Appl. No. 17/680,621, filed Feb. 25, 2022, 11 pages.

\* cited by examiner

USE OF CLUSTER-LEVEL REDUNDANCY WITHIN A CLUSTER OF A DISTRIBUTED STORAGE MANAGEMENT SYSTEM TO ADDRESS NODE-LEVEL ERRORS

CROSS-REFERENCE TO RELATED PATENTS

This application claims the benefit of priority to U.S. Provisional Application No. 63/279,892, filed on Nov. 16, 2021, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2021-2022, NetApp, Inc.

FIELD

Various embodiments of the present disclosure generally relate to data storage management systems and the use of distributed file systems. In particular, some embodiments relate to the use of cluster-level redundancy within a cluster of a distributed storage management system to address various types of node-level errors that may arise.

BACKGROUND

A distributed storage management system typically includes one or more clusters, each cluster including various nodes or storage nodes that handle providing data storage and access functions to clients or applications. A node or storage node is typically associated with one or more storage devices. Any number of services may be deployed on the node to enable a client to access data that is stored on the one or more storage devices. A client (or application) may send requests that are processed by services deployed on the node.

SUMMARY

Systems and methods are described for the use of cluster-level redundancy within a distributed storage management system to address various node-level error scenarios. According to one embodiment, a key-value (KV) store of a first node of multiple nodes of a cluster of a distributed storage management system manages storage of data blocks as values and corresponding block identifiers (IDs) as keys by implementing a tree (e.g., an LSM tree) in which each branch of multiple branches of the tree includes a range of block IDs. Responsive to identifying a missing branch of the multiple branches, the first node causes a branch resynchronization process to be performed, including, for each block ID in the range of block IDs of the missing branch (i) reading a data block corresponding to the block ID from a second node of the cluster that maintains redundant information relating to the block ID; and (ii) restoring the block ID within the KV store by writing the data block to the first node.

Other features of embodiments of the present disclosure will be apparent from accompanying drawings and detailed description that follows.

BRIEF DESCRIPTION OF THE DRAWINGS

The present disclosure is best understood from the following detailed description when read with the accompanying figures.

Figure 1:
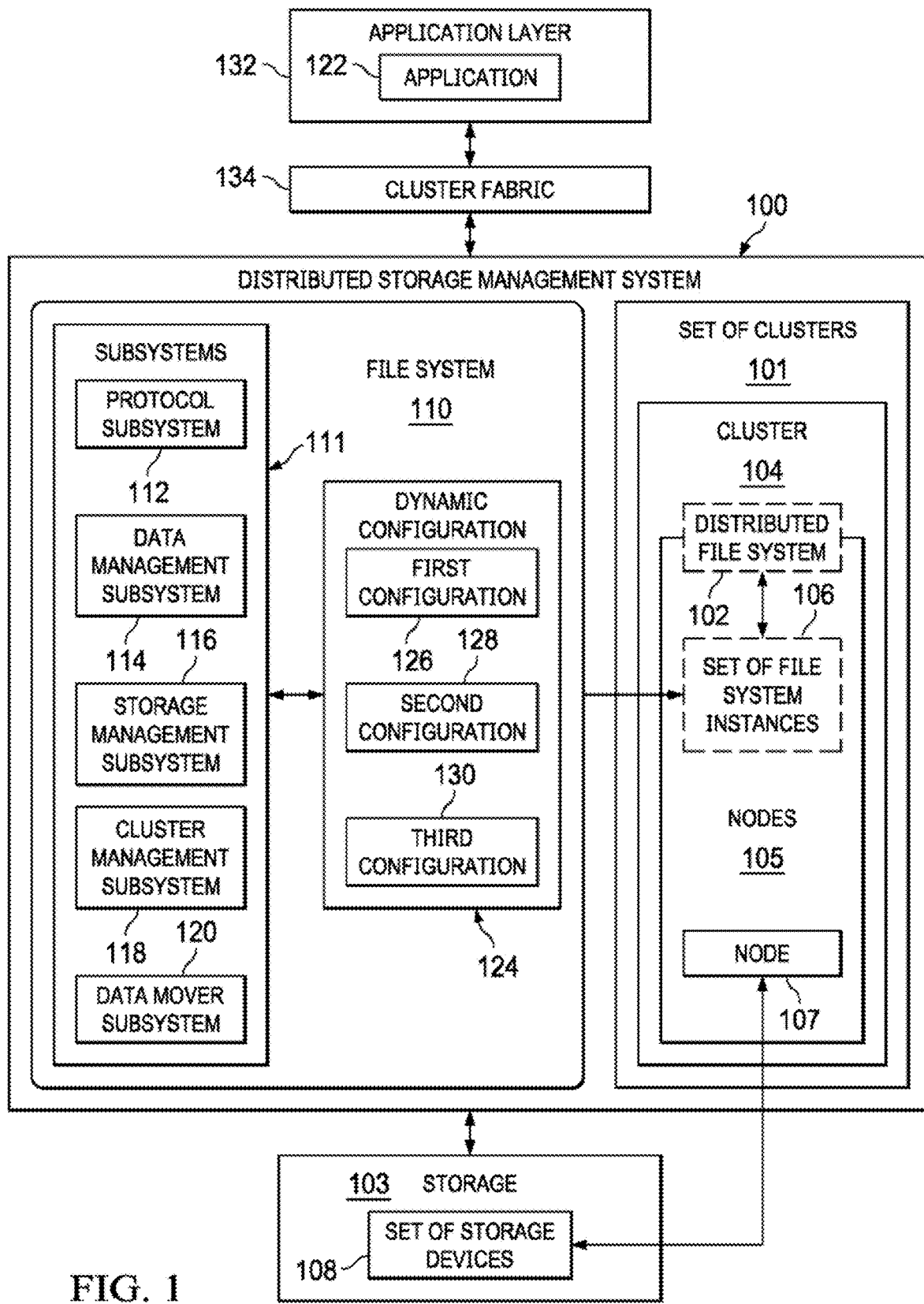
FIG. 1 is a schematic diagram illustrating an example of a distributed storage management system 100 in accordance with one or more embodiments.

The drawings have not necessarily been drawn to scale. Similarly, some components and/or operations may be separated into different blocks or combined into single blocks for the purposes of discussion of some embodiments of the present technology. Moreover, while the technology is amenable to various modifications and alternate forms, specific embodiments have been shown by way of example in the drawings and are described in detail below. The intention, however, is not to limit the technology to the particular embodiments described or shown. On the contrary, the technology is intended to cover all modifications, equivalents, and alternatives falling within the scope of the technology as defined by the appended claims.

DETAILED DESCRIPTION

Systems and methods are described for the use of cluster-level redundancy within a distributed storage management system to address various node-level error scenarios. Although distributed storage systems may employ one or more redundancy mechanisms, at the node level and at the cluster level, for example, including data redundancy based on software Redundant Array of Independent Disks (RAID), replication of metadata objects between metadata services (e.g., helix-replication), and replication of data blocks, some loss of metadata and/or data is inevitable (e.g., as a result of hardware or software failures, power outages, disasters, human error, and the like).

In the context of a distributed storage system (e.g., a cluster of nodes), a number of different node-level error scenarios may arise. In some existing distributed storage systems, in an effort to avoid a potential situation in which a series of worsening node-level errors degrade the node's performance over time and ultimately lead to a node failure, upon detection of any node-level error regardless of severity, the node may be treated as failed and a generalized recovery process may be initiated to restore the desired helix-replication state. For example, a new node may be created to replace the failed node by performing a bin synchronization process to read all of the data and metadata previously stored on failed node from a redundant node in the cluster and write the data and metadata to the new node. This approach of failing fast has the advantage of avoiding potential cascading node-level errors before they can evolve into something more serious. Use of a generalized one-size-fits-all approach to recover from a number of different node-level error scenarios also reduces complexity; however, one tradeoff includes the inefficiency of more often than not doing more than necessary to address the node-level error at issue. Another option for addressing RAID errors on a node is to make use of traditional RAID recovery/reconstruction techniques; however, this approach also has some drawbacks including the resource intensive nature and the rebuild time required. Additionally, performing RAID recovery/reconstruction may need to read the entirety of another drive associated with the node, which could expose an additional media error on the other drive and might therefore result in a double failure that cannot be addressed by RAID and a longer period of operation in a lesser helix state (e.g., a single helix state) than desired.

Various embodiments described herein seek to avoid the various shortcomings of the aforementioned approaches by performing a data/metadata recovery or resynchronization process to address a specifically identified node-level error scenario by making use of cluster-level redundancy mechanisms. Non-limiting examples of the types of node-level error scenarios that may arise include: (i) a first scenario in which a single block ID may be determined to be lost or damaged; (ii) a second scenario in which a RAID stripe error is identified; (iii) a third scenario in which a branch of a log-structured merge tree (LSM tree) is missing; and (iv) a fourth scenario in which a list of block IDs have been identified as missing, for example, as a result of performance of data integrity checking. In various examples described herein, rather than treating a node as failed in response to observing any node-level error and rather than making use of RAID recovery/reconstruction, a recovery approach specifically tailored for the node-level error scenario at issue may be performed as described further below with reference to FIGS. 6A-6E and 7-11.

According to one embodiment, error recovery may be performed to address the third scenario referenced above. As described further below, an instance of a key-value (KV) store of a first node of multiple nodes of a cluster of a distributed storage management system may manage storage of data blocks as values and corresponding block identifiers (IDs) as keys by implementing a tree (e.g., an LSM tree) in which each branch of multiple branches of the tree includes a range of block IDs. Responsive to identifying a missing branch of the multiple branches, the first node or the KV store may cause a branch resynchronization process to be performed. For each block ID in the range of block IDs of the missing branch, the branch resynchronization process may include (i) reading a data block corresponding to the block ID from a second node of the cluster that maintains redundant information relating to the block ID; and (ii) restoring the block ID within the KV store by writing the data block to the first node.

Those skilled in the art appreciate there are multiple approaches available to ensure data integrity (availability) in the event of various node-level error scenarios. For example, a redundancy scheme, such as duplicating (replicating) blocks may be employed within a cluster of a distributed storage management system. Alternatively, to improve storage efficiency, a data redundancy method other than duplication (replication), such as erasure coding, may be used in which some of the data is encoded with erasure coding and may be used for reconstruction in the event of a node-level error scenario. As such, while various examples may be described herein with reference to replication or duplication of data blocks within a cluster, it is to be understood the various methods described herein are equally applicable to the use of error correction coding as a redundancy method.

The various embodiments described herein also include methods and systems for managing data storage using a distributed storage management system having a composable, service-based architecture that provides scalability, resiliency, and load balancing. The distributed storage management system may include one or more clusters and a distributed file system that is implemented for each cluster. The embodiments described herein provide a distributed file system that is fully software-defined such that the distributed storage management system is hardware agnostic. For example, the distributed storage management system may be packaged as a container and can run on any server class hardware that runs a Linux operating system with no dependency on the Linux kernel version. The distributed storage management system may be deployable on an underlying Kubernetes platform, inside a Virtual Machine (VM), or run on bare-metal Linux.

Further, the embodiments described herein provide a distributed file system that can scale on-demand, maintain resiliency even when scaled, automatically detect node failure within a cluster and self-heal, and load balance to ensure an efficient use of computing resources and storage capacity across a cluster. The distributed file system described herein may be a composable service-based architecture that provides a distributed web scale storage with multi-protocol file and block access. The distributed file system may provide a scalable, resilient, software defined architecture that can be leveraged to be the data plane for existing as well as new web scale applications.

The distributed file system has disaggregated data management and storage management subsystems or layers. For example, the distributed file system has a data management subsystem that is disaggregated from a storage management subsystem such that the data management subsystem operates separately from and independently of, but in communication with, the storage management subsystem. The data management subsystem and the storage management subsystem are two distinct systems, each containing one or more software services. The data management subsystem performs file and data management functions, while the storage management subsystem performs storage and block management functions. In one or more embodiments, the data management subsystem and the storage management subsystem are each implemented using different portions of a Write Anywhere File Layout (WAFL®) file system. For example, the data management subsystem may include a first portion of the functionality enabled by a WAFL® file system and the storage management subsystem may include a second portion of the functionality enabled by a WAFL® file system. The first portion and the second portion are different, but in some cases, the first portion and the second portion may partially overlap. This separation of functionality via two different subsystems contributes to the disaggregation of the data management subsystem and the storage management subsystem.

Disaggregating the data management subsystem from the storage management subsystem, which includes a distributed block persistence layer and a storage manager, may enable various functions and/or capabilities. The data management subsystem may be deployed on the same physical node as the storage management subsystem, but the decoupling of these two subsystems enables the data management subsystem to scale according to application needs, independently of the storage management subsystem. For example, the number of instances of the data management subsystem may be scaled up or down independently of the number of instances of the storage management subsystem. Further, each of the data management subsystem and the storage management subsystem may be spun up independently of the other. The data management subsystem may be scaled up per application needs (e.g., multi-tenancy, QoS needs, etc.), while the storage management subsystem may be scaled per storage needs (e.g., block management, storage performance, reliability, durability, and/or other such needs, etc.)

The disaggregation of the data management subsystem and the storage management subsystem allows exposing clients or application to file system volumes but allowing them to be kept separate from, decoupled from, or otherwise agnostic to the persistence layer and actual storage. For example, the data management subsystem exposes file system volumes to clients or applications via the application layer, which allows the clients or applications to be kept separate from the storage management subsystem and thereby, the persistence layer. For example, the clients or applications may interact with the data management subsystem without ever be exposed to the storage management subsystem and the persistence layer and how they function. This decoupling may enable the data management subsystem and at least the distributed block layer of the storage management subsystem to be independently scaled for improved performance, capacity, and utilization of resources. The distributed block persistence layer may implement capacity sharing effectively across various applications in the application layer and may provide efficient data reduction techniques such as, for example, but not limited to, global data deduplication across applications.

Further, the distributed file system may be capable of mapping multiple file system volumes (pertaining to multiple applications) to the underlying distributed block layer with the ability to service I/O operations in parallel for all of the file system volumes. Still further, the distributed file system enables sharing physical storage blocks across multiple file system volumes by leveraging the global dedupe capabilities of the underlying distributed block layer.

Resiliency of the distributed file system is enhanced via leveraging a combination of block replication (e.g., for node failure) and software Redundant Array of Independent Disks (RAID) (e.g., for drive failures within a node). Still further, recovery of local drive failures may be optimized by rebuilding from RAID locally and without having to resort to cross-node data block transfers. In one embodiment, the use of a RAID-protected virtualized storage may help protect against drive failures at the node level within the cluster. For example, the disks associated with a particular node may represent a RAID group operating in accordance with RAID level 5.

In this manner, the distributed file system of the distributed storage management system described herein provides various capabilities that improve the performance and utility of the distributed storage management system as compared to traditional data storage solutions.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

Referring now to the figures, FIG. 1 is a schematic diagram illustrating an example of a distributed storage management system 100 in accordance with one or more embodiments. In one or more embodiments, distributed storage management system 100 is implemented at least partially virtually. Distributed storage management system 100 includes set of clusters 101 and storage 103. Distributed file system 102 may be implemented within set of clusters 101. Set of clusters 101 includes one or more clusters. Cluster 104 is an example of one cluster in set of clusters 101. In one or more embodiments, each cluster in set of clusters 101 may be implemented in a manner similar to that described herein for cluster 104.

Storage 103 associated with cluster 104 may include storage devices that are at a same geographic location (e.g., within a same datacenter, in a single on-site rack, inside a same chassis of a storage node, etc. or a combination thereof) or at different locations (e.g., in different datacenters, in different racks, etc. or a combination thereof). Storage 103 may include disks (e.g., solid state drives (SSDs)), disk arrays, non-volatile random-access memory (NVRAM), one or more other types of storage devices or data storage apparatuses, or a combination thereof. In some embodiments, storage 103 includes one or more virtual storage devices such as, for example, without limitation, one or more cloud storage devices.

Cluster 104 includes a plurality of nodes 105. Distributed storage management system 100 includes set of file system instances 106 that are implemented across nodes 105 of cluster 104. Set of file system instances 106 may form distributed file system 102 within cluster 104. In some embodiments, distributed file system 102 is implemented across set of clusters 101. Nodes 105 may include a small or large number nodes. In some embodiments, nodes 105 may include 10 nodes, 20 nodes, 40 nodes, 50 nodes, 80 nodes, 100 nodes, or some other number of nodes. At least a portion (e.g., one, two, three, or more) of nodes 105 is associated with a corresponding portion of storage 103. Node 107 is one example of a node in nodes 105. Node 107 may be associated with (e.g., connected or attached to and in communication with) set of storage devices 108 of storage 103. In one or more embodiments, node 107 may include a virtual implementation or representation of a storage controller or a server, a virtual machine such as a storage virtual machine, software, or combination thereof.

Each file system instance of set of file system instances 106 may be an instance of file system 110. In one or more embodiments, distributed storage management system 100 has a software-defined architecture. In some embodiments, distributed storage management system 100 is running on a Linux operating system. In one or more embodiments, file system 110 has a software-defined architecture such that each file system instance of set of file system instances 106 has a software-defined architecture. A file system instance may be deployed on a node of nodes 105. In some embodiments, more than one file system instance may be deployed on a particular node of nodes 105. For example, one or more file system instances may be implemented on node 107.

File system 110 includes various software-defined subsystems that enable disaggregation of data management and storage management. For example, file system 110 includes a plurality of subsystems 111, which may be also referred to as a plurality of layers, each of which is software-defined. For example, each of subsystems 111 may be implemented using one or more software services. This software-based implementation of file system 110 enables file system 110 to be implemented fully virtually and to be hardware agnostic.

Subsystems 111 include, for example, without limitation, protocol subsystem 112, data management subsystem 114, storage management subsystem 116, cluster management subsystem 118, and data mover subsystem 120. Because subsystems 111 are software service-based, one or more of subsystems 111 can be started (e.g., "turned on") and stopped ("turned off") on-demand. In some embodiments, the various subsystems 111 of file system 110 may be implemented fully virtually via cloud computing.

Protocol subsystem 112 may provide access to nodes 105 for one or more clients or applications (e.g., application 122) using one or more access protocols. For example, for file access, protocol subsystem 112 may support a Network File System (NFS) protocol, a Common Internet File System (CIFS) protocol, a Server Message Block (SMB) protocol, some other type of protocol, or a combination thereof. For block access, protocol subsystem 112 may support an Internet Small Computer Systems Interface (iSCSI) protocol. Further, in some embodiments, protocol subsystem 112 may handle object access via an object protocol, such as Simple Storage Service (S3). In some embodiments, protocol subsystem 112 may also provide native Portable Operating System Interface (POSIX) access to file clients when a client-side software installation is allowed as in, for example, a Kubernetes deployment via a Container Storage Interface (CSI) driver. In this manner, protocol subsystem 112 functions as the application-facing (e.g., application programming interface (API)-facing) subsystem of file system 110.

Data management subsystem 114 may take the form of a stateless subsystem that provides multi-protocol support and various data management functions. In one or more embodiments, data management subsystem 114 includes a portion of the functionality enabled by a file system such as, for example, the Write Anywhere File Layout (WAFL®) file system. For example, an instance of WAFL® may be implemented to enable file services and data management functions (e.g., data lifecycle management for application data) of data management subsystem 114. Some of the data management functions enabled by data management subsystem 114 include, but are not limited to, compliance management, backup management, management of volume policies, snapshots, clones, temperature-based tiering, cloud backup, and/or other types of functions.

Storage management subsystem 116 is resilient and scalable. Storage management subsystem 116 provides efficiency features, data redundancy based on software Redundant Array of Independent Disks (RAID), replication, fault detection, recovery functions enabling resiliency, load balancing, Quality of Service (QoS) functions, data security, and/or other functions (e.g., storage efficiency functions such as compression and deduplication). Further, storage management subsystem 116 may enable the simple and efficient addition or removal of one or more nodes to nodes 105. In one or more embodiments, storage management subsystem 116 enables the storage of data in a representation that is block-based (e.g., data is stored within 4 KB blocks, and inodes are used to identify files and file attributes such as creation time, access permissions, size, and block location, etc.).

Storage management subsystem 116 may include a portion of the functionality enabled by a file system such as, for example, WAFL®. This functionality may be at least partially distinct from the functionality enabled with respect to data management subsystem 114.

Data management subsystem 114 may be disaggregated from storage management subsystem 116, which enables various functions and/or capabilities. In particular, data management subsystem 114 may operate separately from or independently of storage management subsystem 116 but in communication with storage management subsystem 116. For example, data management subsystem 114 may be scalable independently of storage management subsystem 116, and vice versa. Further, this type of disaggregation may enable closer integration of data management subsystem 114 with application layer 132 and thereby, can be configured and deployed with specific application data management policies such as application-consistent checkpoints, roll-backs to a given checkpoint, etc. Additionally, this disaggregation may enable data management subsystem 114 to be run on a same application node as an application in application layer 132. In other embodiments, data management 114 may be run as a separate, independent component within a same node as storage management subsystem 116 and may be independently scalable with respect to storage management subsystem 116.

Cluster management subsystem 118 provides a distributed control plane for managing cluster 104, as well as the addition of resources to and/or the deletion of resources from cluster 104. Such a resource may be a node, a service, some other type of resource, or a combination thereof. Data management subsystem 114, storage management subsystem 116, or both may be in communication with cluster management subsystem 118, depending on the configuration of file system 110. In some embodiments, cluster management subsystem 118 is implemented in a distributed manner that enables management of one or more other clusters.

Data mover subsystem 120 provides management of targets for data movement. A target may include, for example, without limitation, a secondary storage system used for disaster recovery (DR), a cloud, a target within the cloud, a storage tier, some other type of target that is local or remote to the node (e.g., node 107) on which the instance of file system 110 is deployed, or a combination thereof. In one or more embodiments, data mover subsystem 120 can support data migration between on-premises and cloud deployments.

In one or more embodiments, file system 110 may be instanced having dynamic configuration 124. Dynamic configuration 124 may also be referred to as a persona for file system 110. Dynamic configuration 124 of file system 110 at a particular point in time is the particular grouping or combination of the subsystems in subsystems 111 that are started (or turned on) at that particular point in time on the particular node in which the instance of file system 110 is deployed. For example, at a given point in time, dynamic configuration 124 of file system 110 may be first configuration 126, second configuration 128, third configuration 130, or another configuration. With first configuration 126, both data management subsystem 114 and storage management subsystem 116 may be turned on or deployed within a file system instance of a particular node. With second configuration 128, the storage management subsystem 116 may be turned on or deployed within a file system instance of a particular node while a portion or all of the one or more services that make up data management subsystem 114 may not turned on or are not deployed within the file system instance. With third configuration 130, the data management subsystem 114 may be turned on or deployed within a file system instance of a particular node while a portion or all of the one or more services that make up storage management subsystem 116 are not turned on or are not deployed. In some embodiments, dynamic configuration 124 is a configuration that can change over time depending on the needs of a client or application in association with file system 110. For example, an application owner may add a new node (e.g., a new Kubernetes worker node, a new VM, a new physical server, or a just a bunch of disks (JBOD) system, as the case may be) from a heterogeneous resource pool for use by cluster 104 to provide additional performance and/or storage capacity in support of the application owner's desire to add a new application or in response to being notified by the distributed storage management system 100 of changing application performance and/or storage characteristics over time. The availability of the new node may trigger performance of automated scaling by distributed storage management system 100 of performance and/or storage capacity based on the capabilities of the new node.

Cluster 104 is in communication with one or more clients or applications via application layer 132 that may include, for example, application 122. In one or more embodiments, nodes 105 of cluster 104 may communicate with each other and/or through application layer 132 via cluster fabric 134.

In some cases, data management subsystem 114 is implemented virtually "close to" or within application layer 132. For example, the disaggregation or decoupling of data management subsystem 114 and storage management subsystem 116 may enable data management subsystem 114 to be deployed outside of nodes 105. In one or more embodiments, data management subsystem 114 may be deployed in application layer 132 and may communicate with storage management subsystem 116 over one or more communications links and using protocol subsystem 112. In some embodiments, the disaggregation or decoupling of data management subsystem 114 and storage management subsystem 116 may enable a closer integration of data management functions with application layer management policies. For example, data management subsystem 114 may be used to define an application tenancy model, enable app-consistent checkpoints, enable a roll-back to a given checkpoint, perform other application management functions, or a combination thereof.

As noted above, various embodiments described herein allow a distributed storage management system (e.g., distributed storage management system 100) to take advantage of the types of nodes made available to it within a heterogeneous resource pool by selectively instating appropriate services on the nodes based on their respective attributes/ characteristics/capacities. Those skilled in the art will appreciate as more drive capacity becomes available for use by the distributed storage management system, scaling the number of storage management subsystems (e.g., storage management subsystem 116), for example, providing block and storage management services within a cluster (e.g., cluster 104) increases the total storage capacity of the cluster. The benefits of scaling the number of data management subsystems (e.g., data management subsystem 114), for example, providing file and volume service are more complex and varied as the factors that may be constrained by the number of data management subsystems within the cluster and the CPU resources per data management subsystems include the number of volumes and input/output operations per second (IOPS). As such, by increasing the number of data management subsystems in a cluster, more volumes may be created and/or more IOPS/GB may be added to existing volumes due to having fewer volumes per data management subsystem. The latter translates into lower latency and higher throughput, which would thus improve application performance. The former allows for more volumes and thus more applications to be allocated to use the storage.

Figure 2:
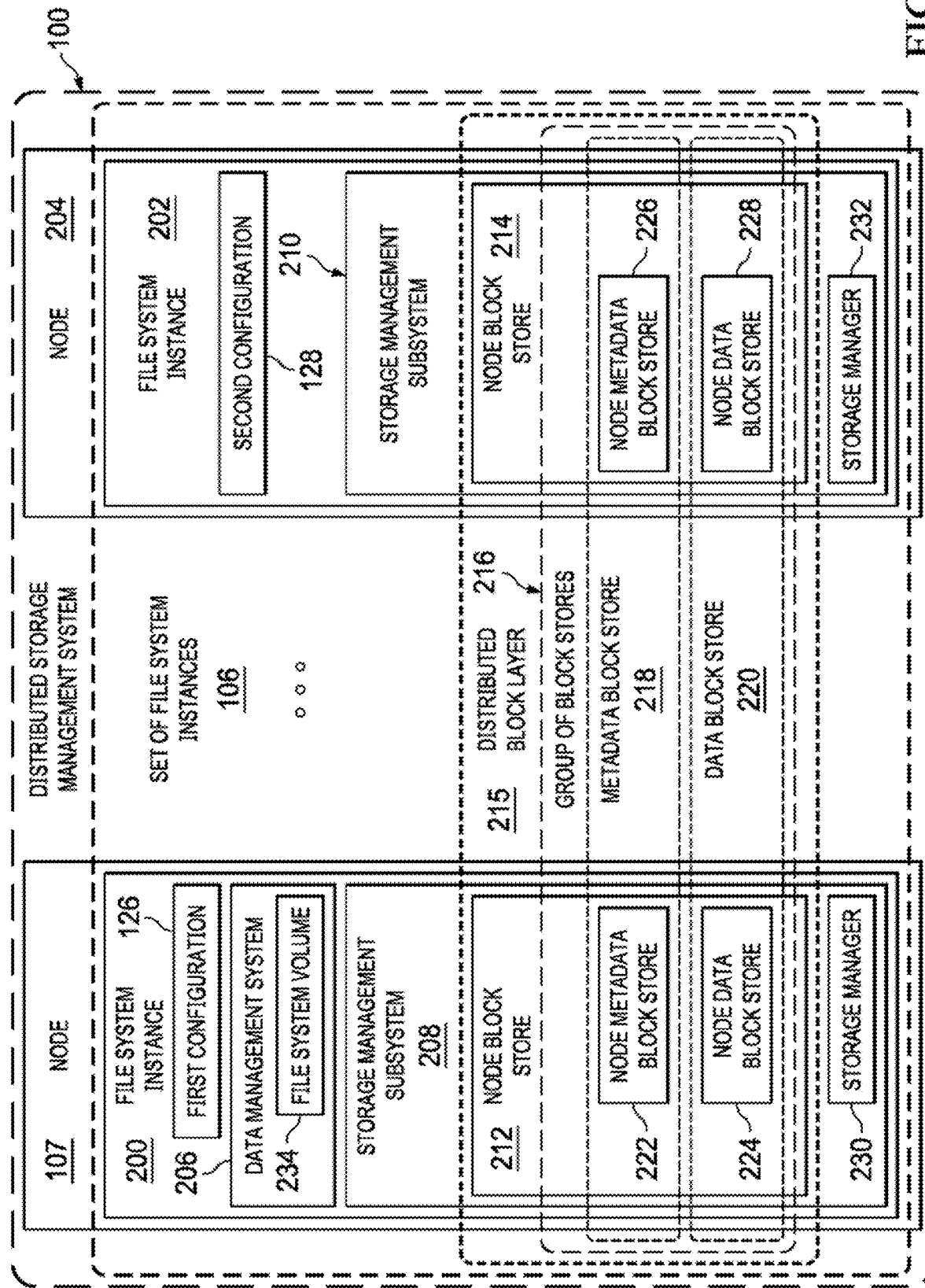
FIG. 2 is another schematic diagram of distributed storage management system 100 from FIG. 1 in accordance with one or more embodiments.

FIG. 2 is another schematic diagram of distributed storage management system 100 from FIG. 1 in accordance with one or more embodiments. As previously described, distributed storage management system 100 includes set of file system instances 106, each of which is an instance of file system 110 in FIG. 1. In one or more embodiments, set of file system instances 106 includes file system instance 200 deployed on node 107 and file system instance 202 deployed on node 204. File system instance 200 and file system instance 202 are instances of file system 110 described in FIG. 1. Node 107 and node 204 are both examples of nodes in nodes 105 in cluster 104 in FIG. 1.

File system instance 200 may be deployed having first configuration 126 in which both data management subsystem 206 and storage management subsystem 208 are deployed. One or more other subsystems of subsystems 111 in FIG. 1 may also be deployed in first configuration 126. File system instance 202 may have second configuration 128 in which storage management subsystem 210 is deployed and no data management subsystem is deployed. In one or more embodiments, one or more subsystems in file system instance 200 may be turned on and/or turned off on-demand to change the configuration of file system instance 200 on-demand. Similarly, in one or more embodiments, one or more subsystems in file system instance 202 may be turned on and/or turned off on-demand to change the configuration of file system instance 202 on-demand.

Data management subsystem 206 may be an instance of data management subsystem 114 described in FIG. 1. Storage management subsystem 208 and storage management subsystem 210 may be instances of storage management subsystem 116 in FIG. 1.

Storage management subsystem 208 includes node block store 212 and storage management subsystem 210 includes node block store 214. Node block store 212 and node block store 214 are two node block stores in a plurality of node block stores that form distributed block layer 215 of distributed storage management system 100. Distributed block layer 215 is a distributed block virtualization layer (which may be also referred to as a distributed block persistence layer) that virtualizes storage 103 connected to nodes 105 in FIG. 1 into a group of block stores 216 that are globally accessible by the various ones of nodes 105 in FIG. 1, including node 107 and node 204. Each block store in group of block stores 216 is a distributed block store that spans cluster 104 in FIG. 1. Distributed block layer 215 enables any one of nodes 105 in cluster 104 in FIG. 1 to access any one or more blocks in group of block stores 216.

In one or more embodiments, group of block stores 216 may include, for example, at least one metadata block store 218 and at least one data block store 220 that are distributed across nodes 105 in cluster 104, including node 107 and node 204. Thus, metadata block store 218 and data block store 220 may also be referred to as a distributed metadata block store and a distributed data block store, respectively. In one or more embodiments, node block store 212 includes node metadata block store 222 and node data block store 224. Node block store 214 includes node metadata block store 226 and node data block store 228. Node metadata block store 222 and node metadata block store 226 form at least a portion of metadata block store 218. Node data block store 224 and node data block store 228 form at least a portion of data block store 220.

Storage management subsystem 208 further includes storage manager 230; storage management subsystem 210 further includes storage manager 232. Storage manager 230 and storage manager 232 may be implemented in various ways. In one or more examples, each of storage manager 230 and storage manager 232 includes a portion of the functionality enabled by a file system such as, for example, WAFL, in which different functions are enabled as compared to the instance of WAFL enabled with data management subsystem 114. Storage manager 230 and storage manager 232 enable management of the one or more storage devices associated with node 107 and node 204, respectively. Storage manager 230 and storage manager 232 may provide various functions including, for example, without limitation, checksums, context protection, RAID management, handling of unrecoverable media errors, other types of functionality, or a combination thereof.

Although node block store 212 and node block store 214 are described as being part of or integrated with storage management subsystem 208 and storage management subsystem 210, respectively, in other embodiments, node block store 212 and node block store 214 may be considered separate from but in communication with the respective storage management subsystems, together providing the functional capabilities described above.

File system instance 200 and file system instance 202 may be parallel file systems. Each of file system instance 200 and file system instance 202 may have its own metadata functions that operate in parallel with respect to the metadata functions of the other file system instances in distributed file system 102. In some embodiments, each of file system instance 200 and file system instance 202 may be configured to scale to 2 billion files. Each of file system instance 200 and file system instance 202 may be allowed to expand as long as there is available capacity (e.g., memory, CPU resources, etc.) in cluster 104 in FIG. 1.

In one or more embodiments, data management subsystem 206 supports and exposes one or more file system volumes, such as, for example, file system volume 234, to application layer 132 in FIG. 1. File system volume 234 may include file system metadata and file system data. The file system metadata and file system data may be stored in data blocks in data block store 220. In other words, the file system metadata and the file system data may be distributed across nodes 105 within data block store 220. Metadata block store 222 may store a mapping of a block of file system data to a mathematically or algorithmically computed hash of the block. This hash may be used to determine the location of the block of the file system data within distributed block layer 215.

Figure 3:
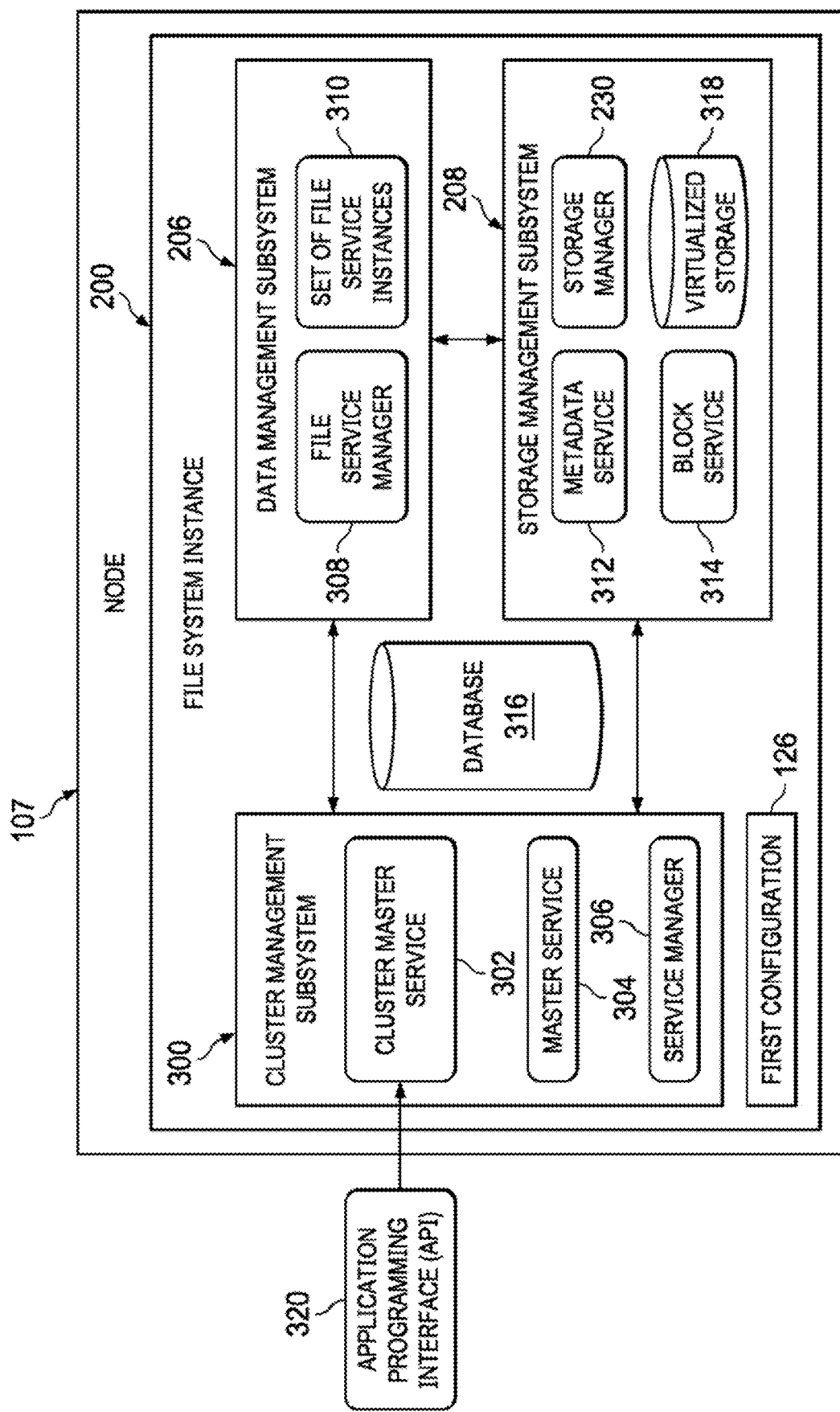
FIG. 3 is a schematic diagram of file system instance deployed on node in accordance with one or more embodiments

FIG. 3 is a schematic diagram of services deployed in file system instance 200 from FIG. 2 in accordance with one or more embodiments. In addition to including data management subsystem 206 and storage management subsystem 208, file system instance 200 includes cluster management subsystem 300. Cluster management subsystem 300 is an instance of cluster management subsystem 118 in FIG. 1.

In one or more embodiments, cluster management subsystem 300 includes cluster master service 302, master service 304, service manager 306, or a combination thereof. In some embodiments, cluster master service 302 may be active in only one node of cluster 104 from FIG. 1 at a time. Cluster master service 302 may be used to provide functions that aid in the overall management of cluster 104. For example, cluster master service 302 may provide various functions including, but not limited to, orchestrating garbage collection, cluster wide load balancing, snapshot scheduling, cluster fault monitoring, one or more other functions, or a combination thereof. Cluster master service 302 may perform some functions responsive to requests received via an API (e.g., API 320).

Master service 304 may be created at the time node 107 is added to cluster 104. Master service 304 may be used to provide functions that aid in the overall management of node 107. For example, master service 304 may provide various functions including, but not limited to, encryption key management, drive management, web server management, certificate management, one or more other functions, or a combination thereof. Further, master service 304 may be used to control or direct service manager 306.

Service manager 306 may be a service that manages the various services deployed in node 107 and memory. Service manager 306 may be used to start, stop, monitor, restart, and/or control in some other manner various services in node 107. Further, service manager 306 may be used to perform shared memory cleanup after a crash of file system instance 200 or node 107.

In one or more embodiments, data management subsystem 206 includes file service manager 308, which may also be referred to as a DMS manager. File service manager 308 serves as a communication gateway between set of file service instances 310 and cluster management subsystem 300. Further, file service manager 308 may be used to start and stop set of file service instances 310 or one or more of the file service instances within set of file service instances 310 in node 107. Each file service instance of set of file service instances 310 may correspond to a set of file system volumes. In some embodiments, the functions provided by file service manager 308 may be implemented partially or fully as part of set of file service instances 310.

In one or more embodiments, storage management subsystem 208 includes storage manager 230, metadata service 312, and block service 314. Metadata service 312 is used to look up and manage the metadata in node metadata block store 222. Further, metadata service 312 may be used to provide functions that include, for example, without limitation, compression, block hash computation, write ordering, disaster or failover recovery operations, metadata syncing, synchronous replication capabilities within cluster 104 and between cluster 104 and one or more other clusters, one or more other functions, or a combination thereof. In some embodiments, a single instance of metadata service 312 is deployed as part of file system instance 200.

In one or more embodiments, block service 314 is used to manage node data block store 224. For example, block service 314 may be used to store and retrieve data that is indexed by a computational hash of the data block. In some embodiments, more than one instance of block service 314 may be deployed as part of file system instance 200. Block service 314 may provide functions including, for example, without limitation, deduplication of blocks across cluster 104, disaster or failover recovery operations, removal of unused or overwritten blocks via garbage collection operations, and other operations.

In various embodiments, file system instance 200 further includes database 316. Database 316 may also be referred to as a cluster database. Database 316 may be used to store and retrieve various types of information (e.g., configuration information) about cluster 104. This information may include, for example, information about first configuration 126, node 107, file system volume 234, set of storage devices 108, or a combination thereof.

The initial startup of file system instance 200 may include starting up master service 304 and connecting master service 304 to database 316. Further, the initial startup may include master service 304 starting up service manager 306, which in turn, may then be responsible for starting and monitoring all other services of file system instance 200. In one or more embodiments, service manager 306 waits for storage devices to appear and may initiate actions that unlock these storage devices if they are encrypted. Storage manager 230 is used to take ownership of these storage devices for node 107 and mount the data in virtualized storage 318. Virtualized storage 318 may include, for example, without limitation, a virtualization of the storage devices attached to node 107. Virtualized storage 318 may include, for example, RAID storage. The initial startup may further include service manager 306 initializing metadata service 312 and block service 314. Because file system instance 200 is started having first configuration 126, service manager 306 may also initialize file service manager 308, which may, in turn, start set of file service instances 310.

Figure 4:
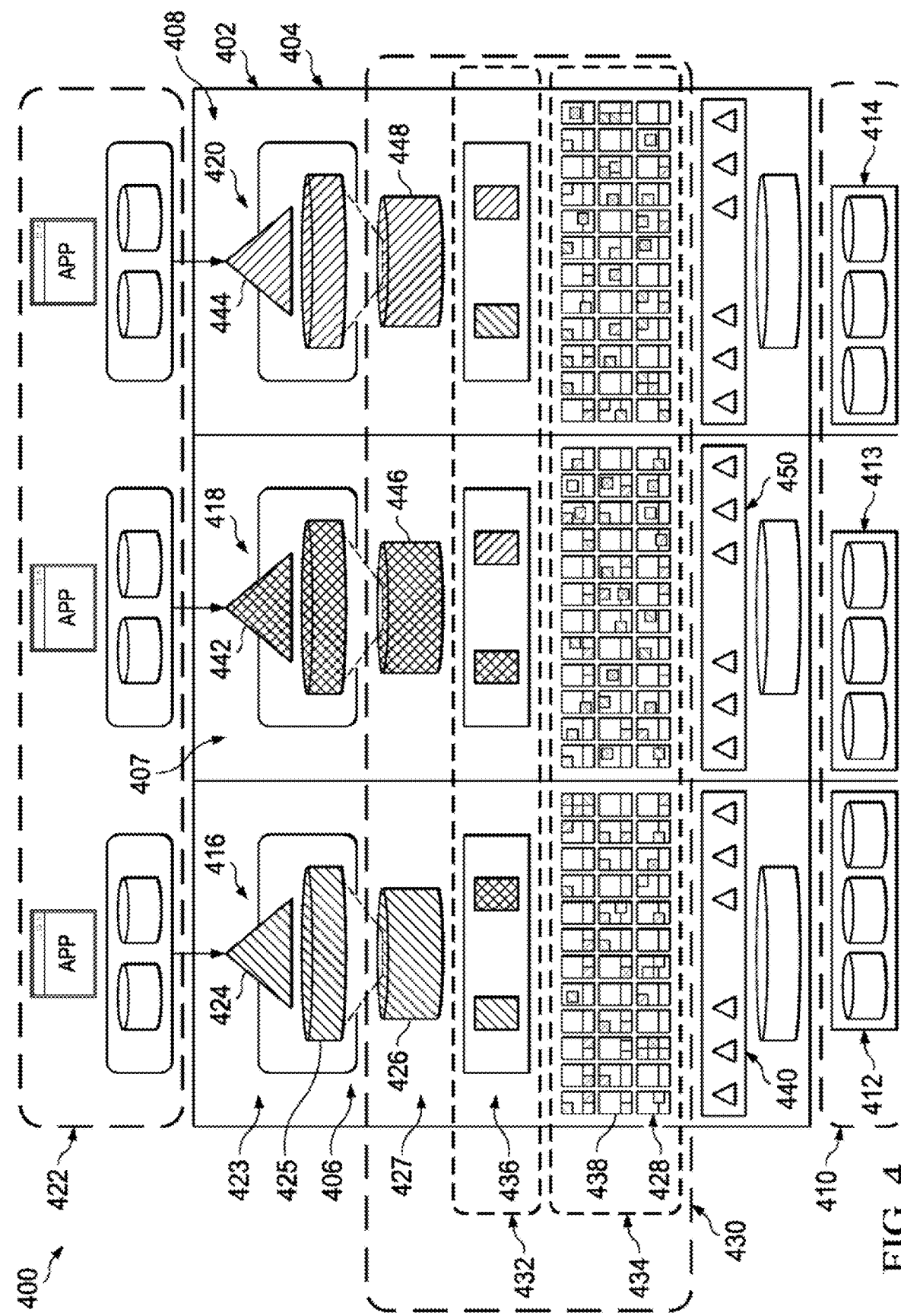
FIG. 4 is a schematic diagram of a distributed file system in accordance with one or more embodiments.

FIG. 4 is a schematic diagram of a distributed file system in accordance with one or more embodiments. Distributed file system 400 may be one example of an implementation for distributed file system 102 in FIG. 1. Distributed file system 400 is implemented across cluster 402 of nodes 404, which include node 406 (e.g., node 1), node 407 (e.g., node 4), and node 408 (e.g., node 3 or node n). Nodes 404 may include 4 nodes, 40 nodes, 60 nodes, 100 nodes, 400 nodes, or some other number of nodes. Cluster 402 and nodes 404 are examples of implementations for cluster 104 and nodes 105, respectively, in FIG. 1.

Each of nodes 404 is associated with (e.g., connected to and in communication with) a corresponding portion of storage 410. Storage 410 is one example of an implementation for storage 103 or at least a portion of storage 103 in FIG. 1. For example, node 406 is associated with set of storage devices 412, node 407 is associated with set of storage devices 413, and node 408 is associated with set of storage devices 414.

Distributed file system 400 includes file system instance 416, file system instance 418, and file system instance 420 deployed in node 406, node 407, and node 408, respectively. File system instance 416, file system instance 418, and file system instance 420 may be example implementations of instances of file system 110 in FIG. 1.

File system instance 416, file system instance 418, and file system instance 420 expose volumes to one or more clients or applications within application layer 422. Application layer 422 may be one example of an implementation for application layer 132 in FIG. 1. In one or more embodiments, file system instance 416, file system instance 418, and file system instance 420 expose, to clients or applications within application layer 422, volumes that are loosely associated with the underlying storage aggregate.

For example, file system instance 416 may be one example of an implementation for file system instance 200 in FIG. 2. File system instance 416 includes data management subsystem 423 and storage management subsystem 427. Data management subsystem 423 is one example implementation of an instance of data management subsystem 114 in FIG. 1 or one example of an implementation of data management subsystem 206 in FIG. 2. Storage management subsystem 427 may be one example implementation of an instance of storage management subsystem 116 in FIG. 1 or one example of an implementation of storage management subsystem 208 in FIG. 2.

Data management subsystem 423 may expose file system volume 424 to one or more clients or applications. In one or more embodiments, file system volume 424 is a FlexVol® that is mapped (e.g., one-to-one) to logical aggregate 425 that is mapped (e.g., one-to-one) to logical block device 426 of storage management subsystem 427. Logical aggregate 425 is a virtual construct that is mapped to logical block device 426, another virtual construct. Logical block device 426 may be, for example, a logical unit number (LUN) device. File system volume 424 and logical block device 426 are decoupled such that a client or application in application layer 422 may be exposed to file system volume 424 but may not be exposed to logical block device 426.

Storage management subsystem 427 includes node block store 428, which is one example of an implementation for node block store 212 in FIG. 2. Node block store 428 is part of distributed block layer 430 that is present across nodes 404 of cluster 402. Distributed block layer 430 may be one example of an implementation for distributed block layer 215 in FIG. 2. Distributed block layer 430 includes a group of block stores, each of which is a distributed block store that is distributed across or spans cluster 402.

In one or more embodiments, distributed block layer 430 includes metadata block store 432 and data block store 434, each of which is a distributed block store as described above. Metadata block store 432 and data block store 434 may be examples of implementations for metadata block store 218 and data block store 220, respectively, in FIG. 2. Node block store 428 of distributed file system 416 includes the portion of metadata block store 432 and the portion of data block store 434 that are hosted on node 406, which may be, for example, node block metadata store 436 and node block data store 438, respectively.

In one or more embodiments, an input/output (I/O) operation (e.g., for a write request or a read request that is received via application layer 422) is mapped to file system volume 424. The received write or read request may reference both metadata and data, which is mapped to file system metadata and file system data in file system volume 424. In one or more embodiments, the request data and request metadata associated with a given request (read request or write request) forms a data block that has a corresponding logical block address (LBA) within logical block device 426. In other embodiments, the request data and the request metadata form one or more data blocks of logical block device 426 with each data block corresponding to one or more logical block addresses (LBAs) within logical block device 426.

A data block in logical block device 426 may be hashed and stored in data block store 434 based on a block identifier for the data block. The block identifier may be or may be based on, for example, a computed hash value for the data block. The block identifier further maps to a data bucket, as identified by the higher order bits (e.g., the first two bytes) of the block identifier. The data bucket, also called a data bin or bin, is an internal storage container associated with a selected node. The various data buckets in cluster 402 are distributed (e.g., uniformly distributed) across nodes 404 to balance capacity utilization across nodes 404 and maintain data availability within cluster 402. The lower order bits (e.g., the remainder of the bytes) of the block identifier identify the location within the node block data store (e.g., node block data store 438) of the selected node where the data block resides. In other words, the lower order bits identify where the data block is stored on-disk within the node to which it maps.

This distribution across nodes 404 may be formed based on, for example, global capacity balancing algorithms that may, in some embodiments, also consider other heuristics (e.g., a level of protection offered by each node). Node block metadata store 436 contains a mapping of the relevant LBA for the data block of logical block device 426 to its corresponding block identifier. As described above, the block identifier may be a computed hash value. In some embodiments, logical block device 426 may also include metadata that is stored in node block metadata store 436. Although node block metadata store 436 and node block data store 438 are shown as being separate stores or layers, in other embodiments, node block metadata store 436 and node block data store 438 may be integrated in some manner (e.g., collapsed into a single block store or layer).

Storage management subsystem 427 further includes storage manager 440, which is one example of an implementation for storage manager. Storage manager 440 provides a mapping between node block store 428 and set of storage devices 412 associated with node 406. For example, storage manager 440 implements a key value interface for storing blocks for node block data store 428. Further, storage manager 440 is used to manage RAID functionality. In one or more embodiments, storage manager 440 is implemented using a storage management service. In various embodiments, storage management subsystem 427 may include one or more metadata (or metadata block) services, one or more data (or data block) services, one or more replication services, or a combination thereof.

In addition to file system instance 416 exposing file system volume 424 to application layer 422, file system instance 418 exposes file system volume 442 and file system instance 420 exposes file system volume 444 to application layer 422. Each of file system volume 424, file system volume 442, and file system volume 444 is disaggregated or decoupled from the underlying logical block device. The data blocks for each of file system volume 424, file system volume 442, and file system volume 444 are stored in a distributed manner across distributed block layer 430 of cluster 402.

For example, file system volume 424, file system volume 442, and file system volume 444 may ultimately map to logical block device 426, logical block device 446, and logical block device 448, respectively. The file system metadata and the file system data from file system volume 424, file system volume 442, and file system volume 444 are both stored in data blocks corresponding to logical block device 426, logical block device 446, and logical block device 448. In one or more embodiments, these data blocks in distributed block layer 430 are uniformly distributed across nodes 404 of cluster 402. Further, in various embodiments, each data block corresponding to one of logical block device 426, logical block device 446, and logical block device 448 may be protected via replication and via virtualized storage. For example, a data block of logical block device 446 of node 407 may be replicated on at least one other node in cluster 404 and may be further protected by virtualized storage 450 within the same node 407.

In other embodiments, the disaggregation or decoupling of data management subsystem 423 and storage management subsystem 427 may enable data management subsystem 423 to be run within application layer 422. For example, data management subsystem 423 may be run as a library that can be statically or dynamically linked to an application within application layer 422 to allow data management system 423 to adhere closely to application failover and data redundancy semantics. Distributed block layer 430 may be accessible from all applications within application layer 422, which may help make failover operations seamless and copy free.

In one or more embodiments, distributed file system 400 may make decisions about how nodes 404 of cluster 402 serve a given file share or how resources available to each of nodes 404 are used. For example, distributed file system 400 may determine which node of nodes 404 will serve a given file share based on the throughput required from the file share as well as how the current load is distributed across cluster 402. Distributed file system 400 may use dynamic load balancing based on various policies including, for example, but not limited to, QoS policies, which may be set for the given file system instance (e.g., file system instance 416) within cluster 402.

Figure 5:
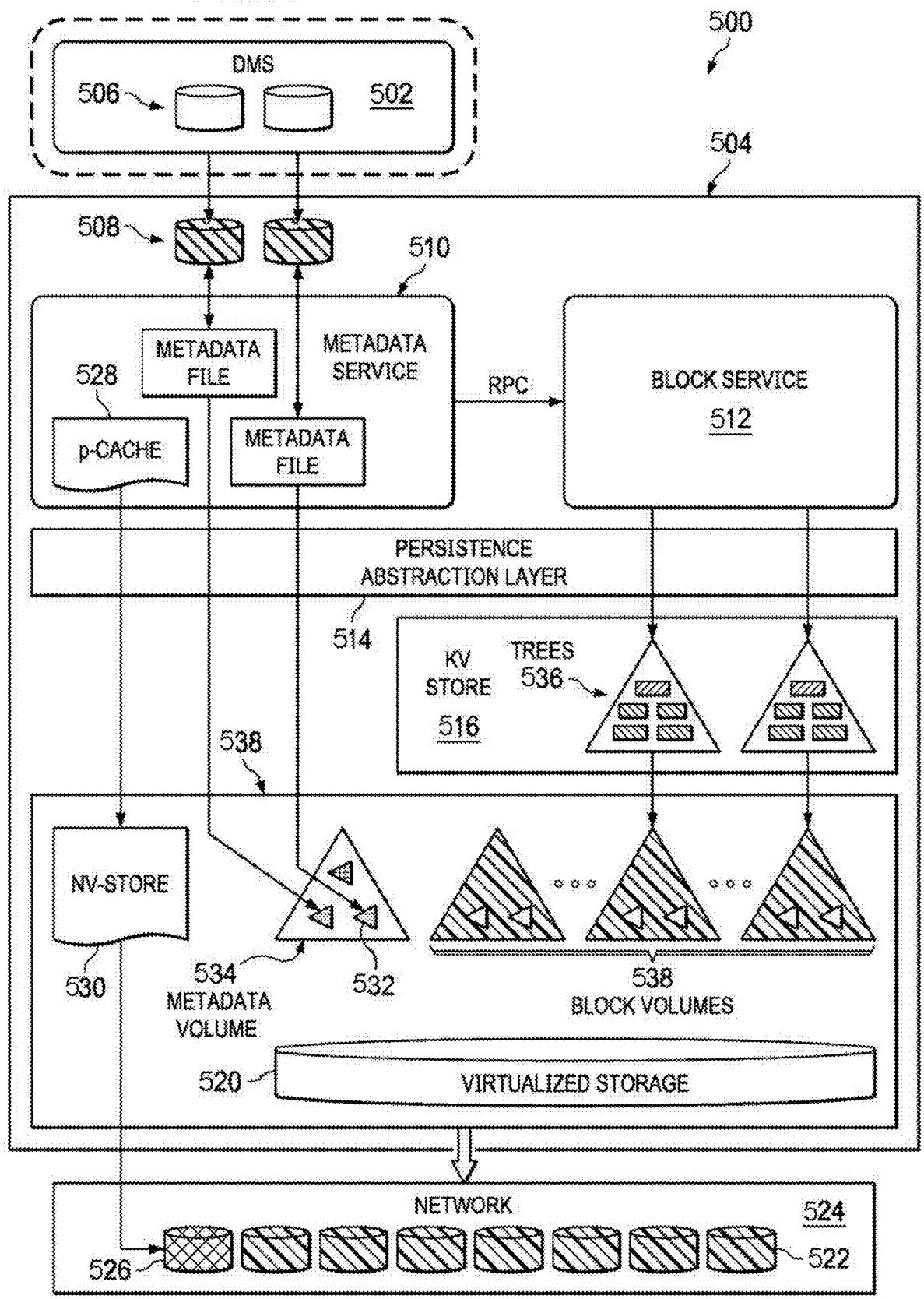
FIG. 5 is a schematic diagram of a portion of a file system in accordance with one or more embodiments.

FIG. 5 is a schematic diagram of a portion of a file system instance in accordance with one or more embodiments. File system instance 500 is one example of an implementation for an instance of file system 110 in FIG. 1. File system instance 500 is one example of an implementation for file system instance 200 in FIG. 2.

File system instance 500 includes data management subsystem 502 and storage management subsystem 504. Data management subsystem 502 may expose file system volume 506 to clients or applications. File system volume 506 includes file system data and file system metadata. In one or more embodiments, file system volume 506 is a flexible volume (e.g., FlexVol®). File system volume 506 may be one of any number of volumes exposed at data management subsystem 502. File system volume 506 may map directly or indirectly to logical block device 508 in storage management subsystem 504. Logical block device 508 may include metadata and data in which the data of logical block device 508 includes both the file system data and the file system metadata of the corresponding file system volume 506. Logical block device 508 may be, for example, a LUN. The file system metadata and the file system data of file system volume 506 may be stored in hash form in the various logical block addresses (LBAs)) of logical block device 508. Further, logical block device 508 may be one of any number of logical block devices on node 406 and, in some embodiments, one of many (e.g., hundreds, thousands, tens of thousands, etc.) logical block devices in the cluster.

Storage management subsystem 504 may include, for example, without limitation, metadata service 510 and block service 512. Metadata service 510, which may be one example of an implementation of at least a portion of metadata block store 218 in FIG. 2, manages metadata services for logical block device 508. Block service 512, which may be one example of an implementation of at least a portion of data block store 220 in FIG. 2, stores the data (e.g., file system data and file system metadata) of logical block device 508.

The metadata of logical block device 508 maps the LBA of the data of logical block device 508 (e.g., the file system data and/or file system metadata) to a block identifier. The block identifier is based on (e.g., may be) the hash value that is computed for the data of logical block device 508. The LBA-to-block identifier mapping is stored in metadata object 532. There may be one metadata object 532 per logical block device 508. Metadata object 532 may be replicated (e.g., helix-replicated) on at least one other node in the cluster.

For example, metadata service 510 may communicate over persistence abstraction layer (PAL) 514 with key-value (KV) store 516 of storage manager 518. Storage manager 518 uses virtualized storage 520 (e.g., RAID) to manage storage 522. Storage 522 may include, for example, data storage devices 524 and logging storage device 526. Logging storage device 526 may be used to log the data and metadata from incoming write requests and may be implemented using, for example, NVRAM. Metadata service 510 may store the file system data and file system metadata from an incoming write request in a primary cache 528, which maps to logical store 530, which in turn, is able to read from and write to logging storage device 526.

As described above, metadata service 510 may store the mapping of LBAs in logical block device 508 to block identifiers in, for example, without limitation, metadata object 532, which corresponds to or is otherwise designated for logical block device 508. Metadata object 532 is stored in metadata volume 534, which may include other metadata objects corresponding to other logical block devices. In some embodiments, metadata object 532 is referred to as a slice file and metadata volume 534 is referred to as a slice volume. In various embodiments, metadata object 532 is replicated to at least one other node in the cluster. The number of times metadata object 532 is replicated may be referred to as a replication factor.

Metadata object 532 enables the looking up of a block identifier that maps to an LBA of logical block device 508. KV store 516 stores data blocks as "values" and their respective block identifiers as "keys." KV store 516 may include, for example, tree 536. In one or more embodiments, tree 536 is implemented using an LSM tree. KV store 516 uses the underlying block volumes 538 managed by storage manager 518 to store keys and values. KV store 516 may keep the keys and values separately on different files in block volumes 538 and may use metadata to point to the data file and offset for a given key. Block volumes 538 may be hosted by virtualized storage 520 that is RAID-protected. Keeping the key and value pair separate may enable minimizing write amplification. Minimizing write amplification may enable extending the life of the underlying drives that have finite write cycle limitations. Further, using KV store 516 aids in scalability. KV store 516 improves scalability with a fast key-value style lookup of data. Further, because the "key" in KV store 516 is the hash value (e.g., content hash of the data block), KV store 516 helps in maintaining uniformity of distribution of data blocks across various nodes within the distributed data block store. In one embodiment, KV store 516 may be implemented using, for example, without limitation, Apache ZooKeeper.

Figure 6A:
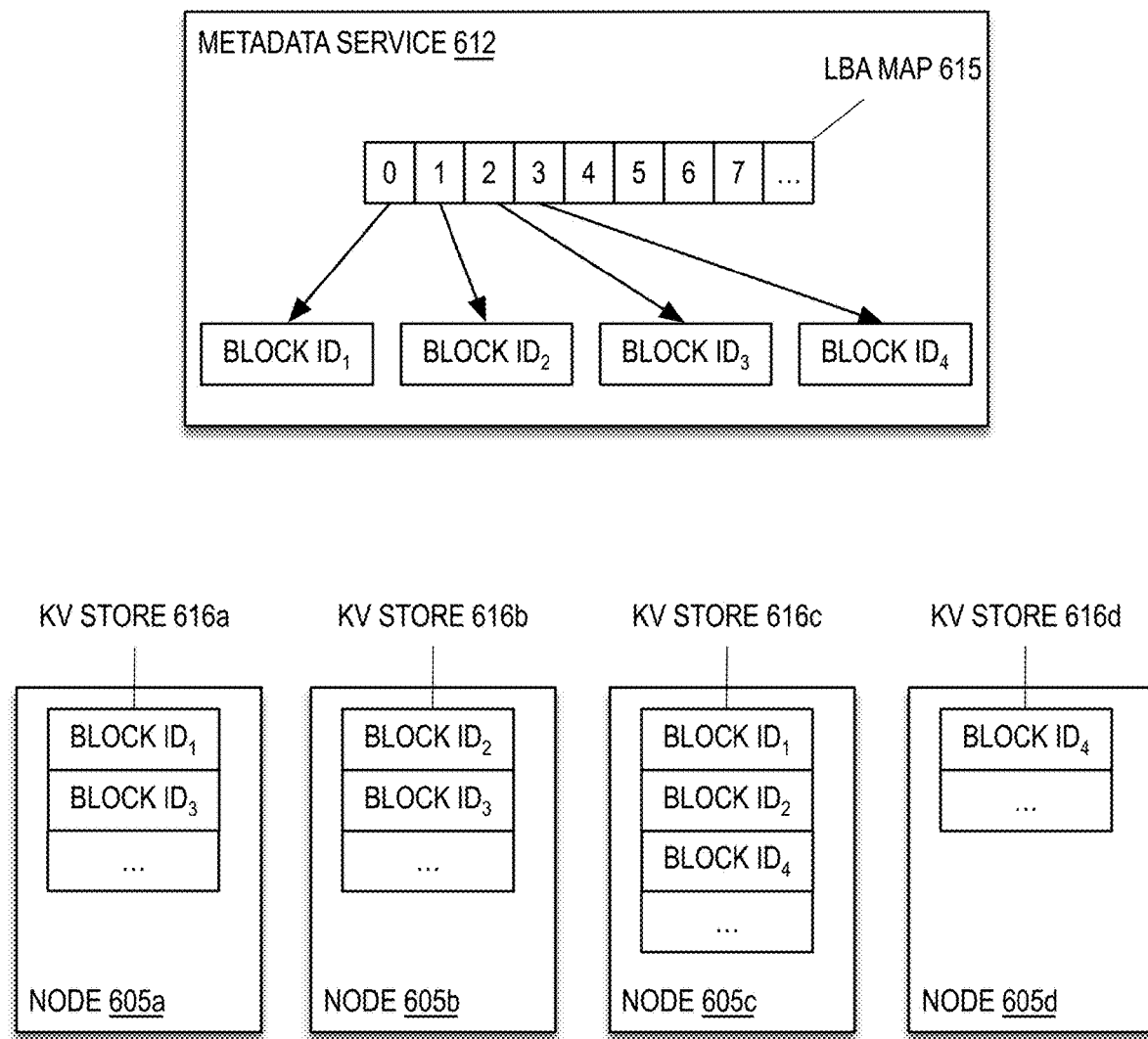
FIG. 6A is a block diagram conceptually illustrating a logical block address (LBA) map of a metadata service and an initial state of instances of a key-value (KV) store on nodes of a cluster in accordance with one or more embodiments.

FIG. 6A is a block diagram conceptually illustrating an initial state of a logical block address (LBA) map 615 and instances 616a-d of a key-value (KV) store on nodes 605a-d of a cluster in accordance with one or more embodiments. As previously described, a distributed storage management system (e.g., distributed storage management system 100 or 400) may include a cluster (e.g., cluster 104 of FIG. 1) of nodes (e.g., nodes 506a-d), which may be analogous to nodes 605a-d. Each of the nodes 605a-d may have respective instances of a KV store 616a-d (which may be analogous to KV store 516 of FIG. 5) each of which may be responsible for a subset of data blocks, for example, those that have been assigned to the block service(s) running on the particular node. Collectively, the KV stores 616a-d may represent a distributed KV store.

In the context of the present example, a metadata service 612 (e.g., which may represent metadata service 510 of FIG. 5) is shown including LBA map 615 that contains a mapping of LBAs of a logical block device (e.g., logical block device 426 of FIG. 4) to corresponding block IDs. In one embodiment, the mapped LBAs in LBA map 615 may represent those of the LBAs in use for one or more file system volumes (e.g., file system volume 234 of FIG. 2) that have been assigned to metadata service 612. In this simplified example, $LBA_0$ maps to block $ID_1$, $LBA_1$ maps to block $ID_2$, $LBA_2$ maps to block $ID_3$, and $LBA_3$ maps to block $ID_4$.

In the context of the present example, a replication factor of 2 is assumed. As a result of replication of data blocks in accordance with the replication factor, each block ID (and its corresponding data) is persisted to two of nodes 605a-d. In this initial state, KV store 616a includes block $ID_1$ and block $ID_3$ (and potentially others) as keys; KV store 616b includes block $ID_2$, block $ID_3$, and block $ID_5$ (and potentially others) as keys; KV store 616c includes block $ID_1$, block $ID_2$, and block $ID_4$ (and potentially others) as keys; and KV store 616d includes block $ID_4$ and block $ID_5$ (and potentially others) as keys.

Figure 6B:
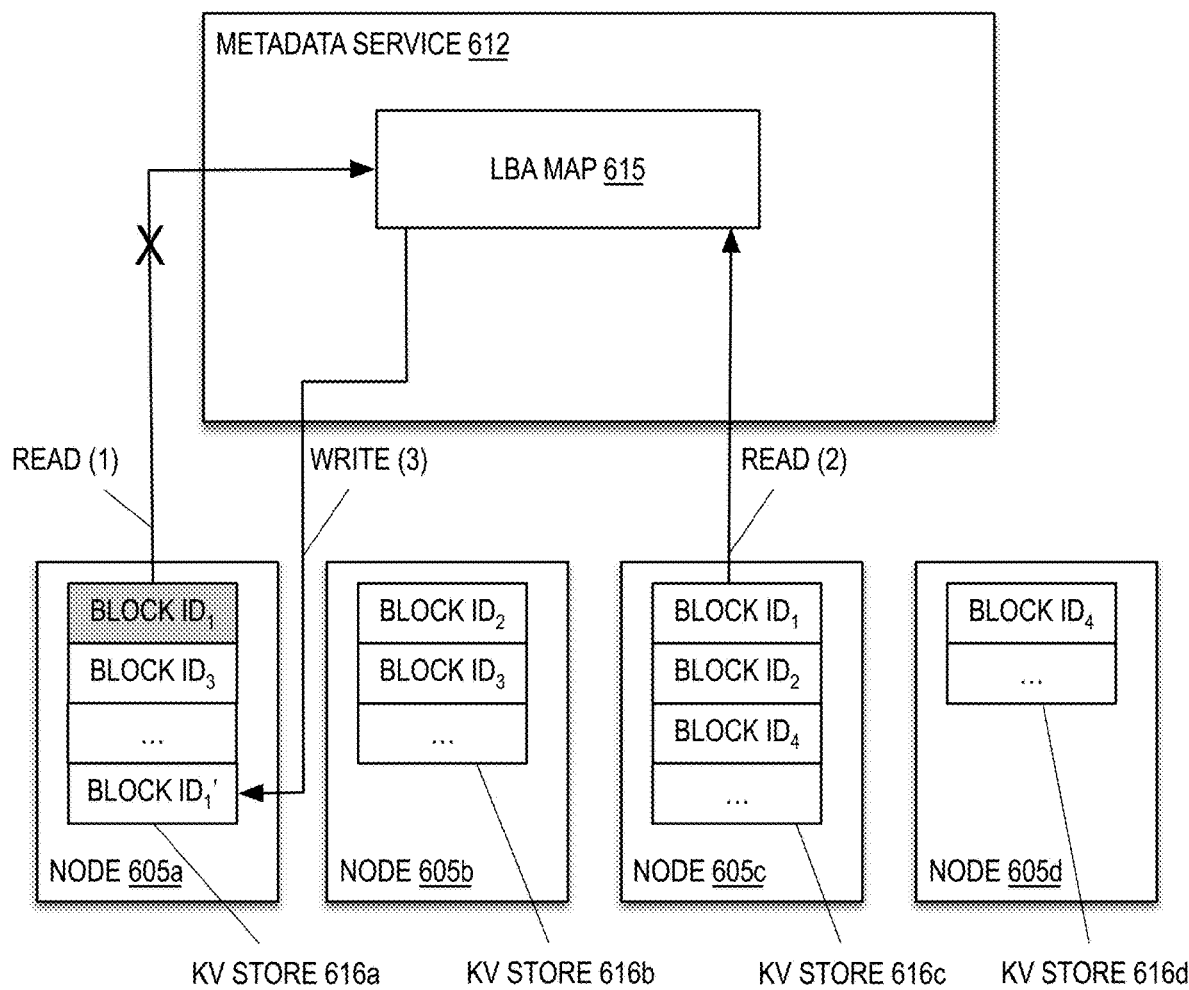
FIG. 6B is a block diagram conceptually illustrating interactions between nodes and the metadata service and an updated state of the instances of the KV store of FIG. 6A as a result of performing a single block recovery in accordance with one or more embodiments.

FIG. 6B is a block diagram conceptually illustrating interactions between nodes 605a-d and the metadata service 612 and an updated state of the instances 616a-d of the KV store of FIG. 6A as a result of performing a single block recovery in accordance with one or more embodiments. In the context of the present example, a single block is determined to be missing (e.g., lost or damaged) as a result of a read operation performed on node 605a, for example, responsive to a client I/O request received by metadata service 612. For example, a read operation for the block ID at issue (e.g., block $ID_1$ shown with a gray background) may fail as a result of the block ID not existing in KV store 616a or because the corresponding data is corrupt as indicated by a checksum verification failure. In the case of the latter, a redundant copy of the data may be read from node 605c to serve the client I/O request. In addition, rather than treating node 605a as failed, the corrupted data may be recovered by writing the redundant copy of the data back to a different storage area of node 605a (e.g., as shown by block $ID_1'$). In this manner, a single block ID failure may be dealt with more efficiently and more quickly. Additional details regarding addressing single block ID failures are described further below with reference to FIG. 8.

Figure 6C:
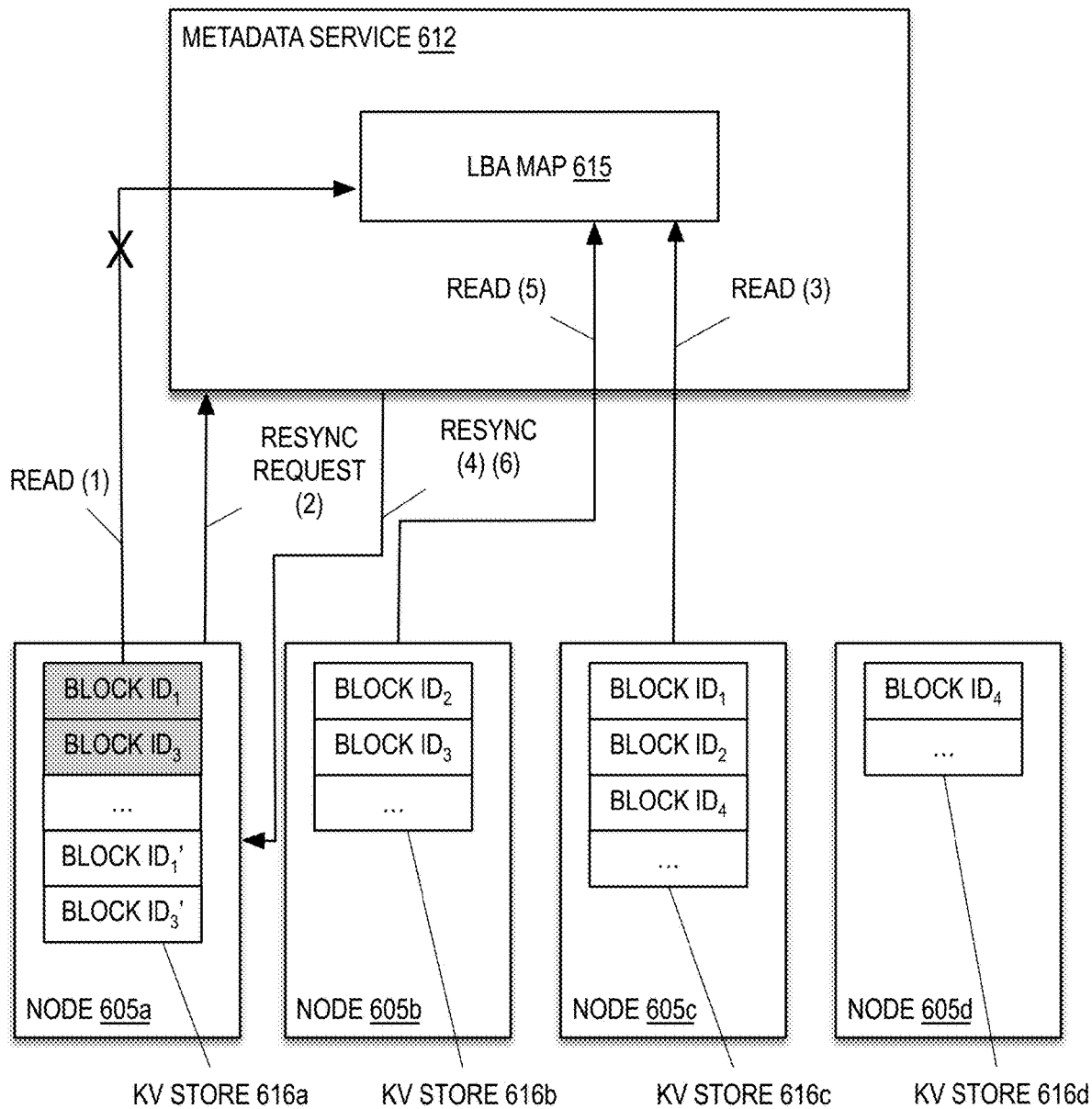
FIG. 6C is a block diagram conceptually illustrating interactions between nodes and the metadata service and an updated state of the instances of the KV store of FIG. 6A as a result of performing a RAID stripe resynchronization in accordance with one or more embodiments.

FIG. 6C is a block diagram conceptually illustrating interactions between nodes 605a-d and the metadata service 612 and an updated state of the instances 616a-d of the KV store of FIG. 6A as a result of performing a RAID stripe resynchronization in accordance with one or more embodiments. In the context of the present example, a chunk of a RAID stripe in which the data corresponding to block $ID_1$ and block $ID_3$ are stored may be bad as indicated by block $ID_1$ and block $ID_3$ being shown with a gray background. The RAID stripe error may be identified at a RAID layer of node 605a during an attempt to read block $ID_1$ or block $ID_3$, for example, responsive to a client I/O request received by metadata service 612. Similar to the example described above with reference to FIG. 6a, a redundant copy of the data may be read from node 605b or 605c to serve the client I/O request. In addition, as above, rather than treating node 605a as failed, the corrupted data may be recovered by writing the redundant copy of the data back to a different storage area of node 605a as shown by block $ID_1'$ and block $ID_3'$, for example, responsive to a RAID stripe resynchronization request issued by node 605a for the block IDs associated with the failed RAID stripe. In this manner, a RAID stripe failure may be dealt with more efficiently and more quickly. Additional details regarding addressing RAID stripe failures are described further below with reference to FIG. 9.

Figure 6D:
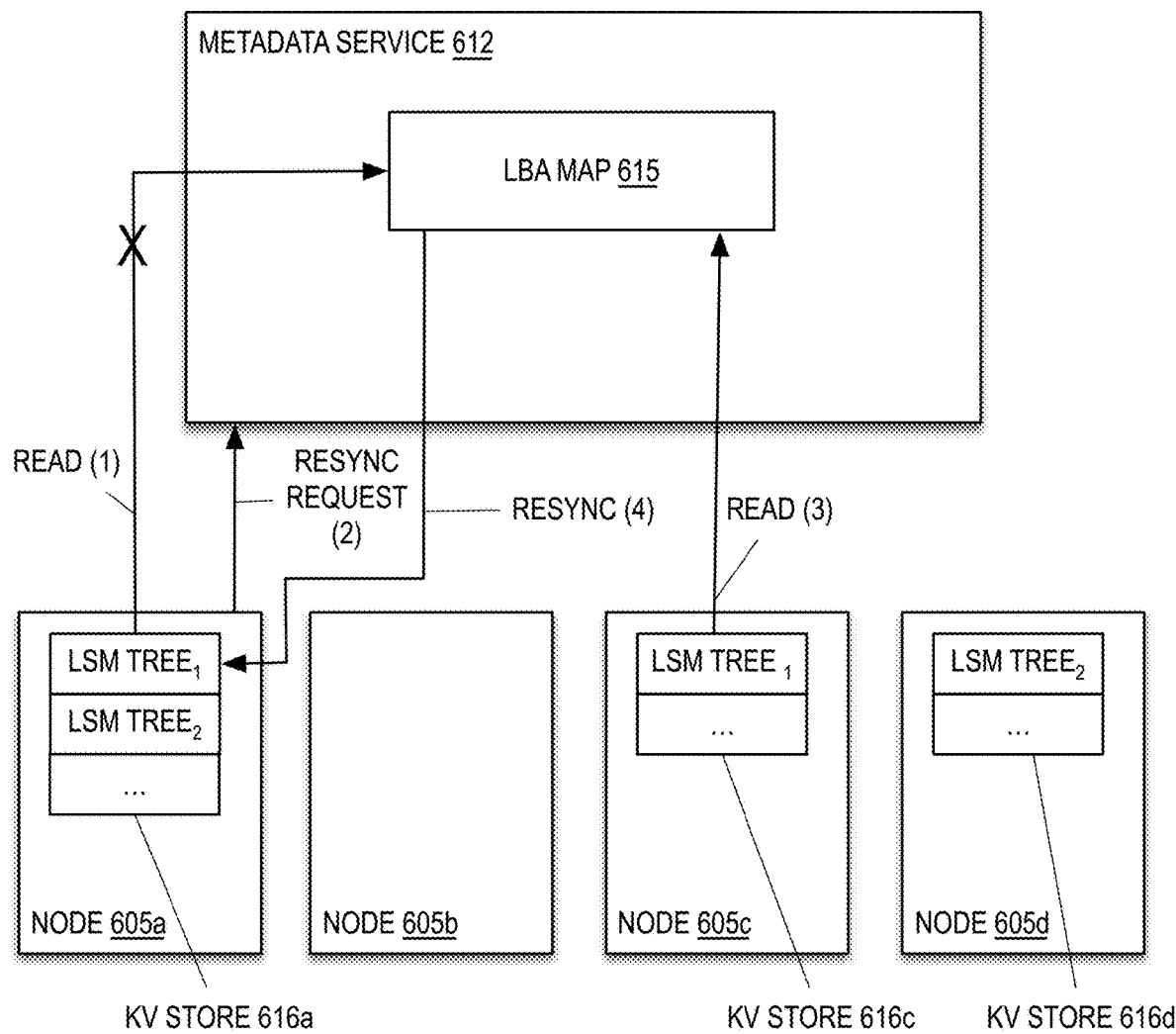
FIG. 6D is a block diagram conceptually illustrating interactions between nodes and the metadata service and an updated state of the instances of the KV store of FIG. 6A as a result of performing a bin or sublist resynchronization in accordance with one or more embodiments.

FIG. 6D is a block diagram conceptually illustrating interactions between nodes 605a-d and the metadata service 612 and an updated state of the instances 616a-d of the KV store of FIG. 6A as a result of performing a bin or sublist resynchronization in accordance with one or more embodiments. In the context of the present example, a chunk of a bad RAID stripe may affect metadata (e.g., the block IDs or "keys") stored within $LSM tree_1$ (e.g., tree 536) of KV store 616a. A missing branch of $LSM tree_1$, representing a range of block IDs associated with one or more bins or sublists, may be identified by KV store 616a during an attempt to read a particular block ID, for example, responsive to a client I/O request received by metadata service 612. In this example, again, rather than treating node 605a as failed, a redundant copy of the metadata may be recovered (e.g., read from node 605c and resynchronized back to $LSM tree_1$) responsive to a resynchronization request issued by node 605a for the bin(s) or sublist(s) of block IDs associated with the missing branch of $LSM tree_1$. In this manner, while the particular block IDs that have been lost may not be known, the corresponding missing bin(s)/sublist(s) associated with the missing branch is/are known, thereby allowing performance of an operation similar to but more efficient than a bin synchronization to be performed because only the missing block IDs will ultimately be recovered as described further below with reference to FIG. 10.

Figure 6E:
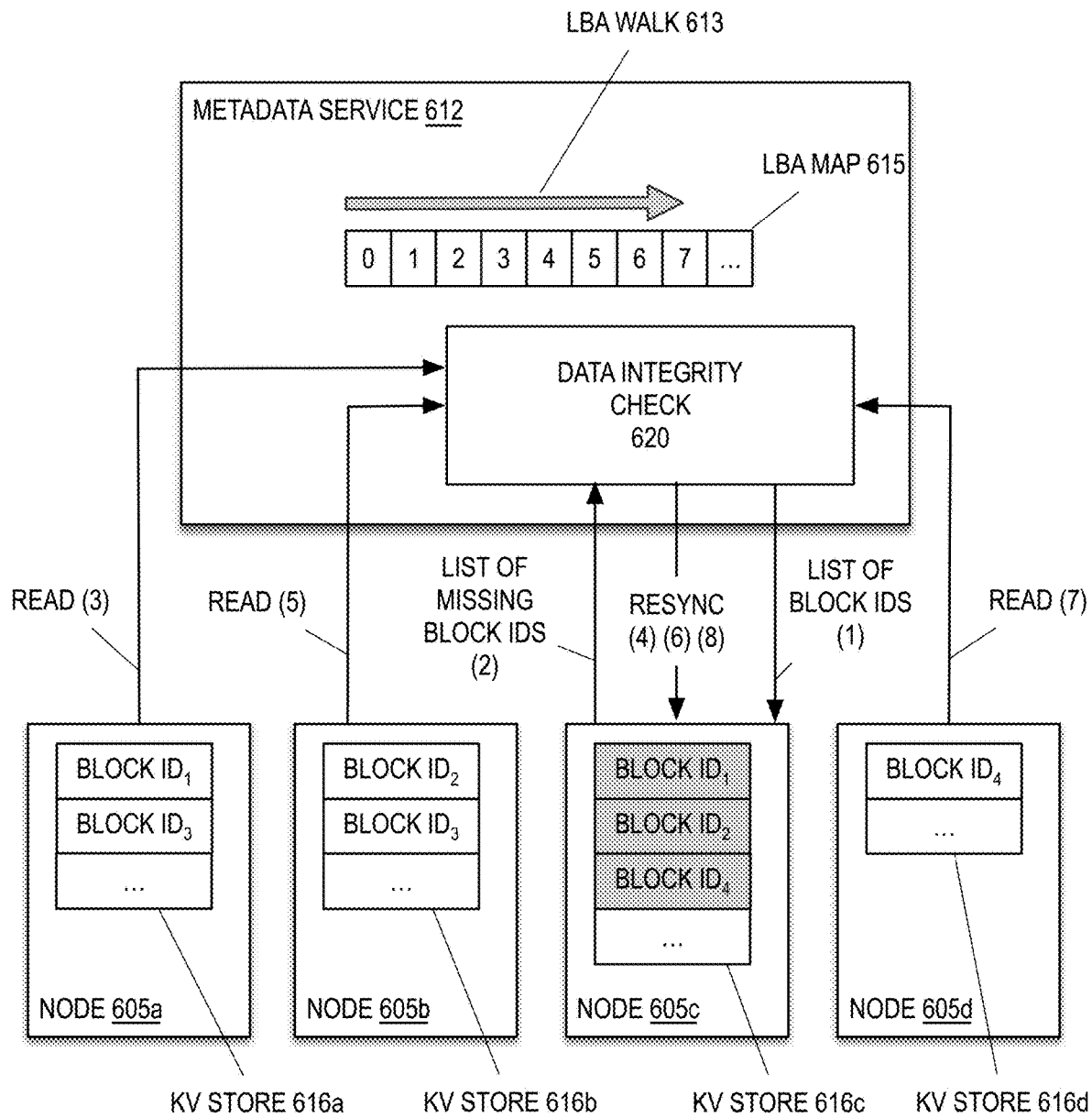
FIG. 6E is a block diagram conceptually illustrating interactions between nodes and the metadata service and an updated state of the instances of the KV store of FIG. 6A as a result of performing a resynchronization of a list of missing block IDs to address data integrity errors in accordance with one or more embodiments.

FIG. 6E is a block diagram conceptually illustrating interactions between nodes 605a-d and the metadata service 612 and an updated state of the instances 616a-d of the KV store of FIG. 6A as a result of performing a resynchronization of a list of missing block IDs to address data integrity errors in accordance with one or more embodiments. The data integrity errors (e.g., missing block $ID_1$, block $ID_2$, and block $ID_4$ shown with gray backgrounds) may be identified as a result of the initiation of an independent data integrity check 620 initiated by metadata service 612 by performing an LBA walk (e.g., LBA walk 613) through all mapped LBAs in its LBA map (e.g., LBA map 615) to identify the block IDs that are currently in use for the volumes associated with the metadata service 612. Alternatively, the data integrity check 620 may be synergistically combined with a garbage collection process while also significantly reducing the associated resource consumption and improving the performance as described further below with reference to FIGS. 12-14. One benefit of incorporating data integrity checking with the periodic performance of garbage collection is that it provides constant data integrity checking, thereby proactively detecting failures quickly. The shrinking of the time window for failure detection can significantly increase the chance for data recovery from a redundant copy of the data.

In the context of the present example, a data integrity check 620 may be initiated by metadata service 612 by requesting KV store 616*c* to confirm the existence of a list of block IDs that are currently in use for the volumes associated with the metadata service 612 as identified by the LBA walk 613. A list of missing block IDs identified to be missing by KV store 616*c* may then be returned to allow a resynchronization to be performed by reading the missing block IDs from the respective redundant nodes and writing the block IDs back to the KV store 616*c*.

The various systems and subsystems (e.g., protocol subsystem 112, data management subsystem 114, storage management subsystem 116, cluster management subsystem 118, and data mover subsystem 120), and/or nodes 105 (when represented in virtual form) of the distributed storage management system described herein, and the processing described with reference to the flow diagrams of FIGS. 7-14 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems (e.g., servers, network storage systems or appliances, blades, etc.) of various forms, such as the computer system described with reference to FIG. 16 below.

Figure 7:
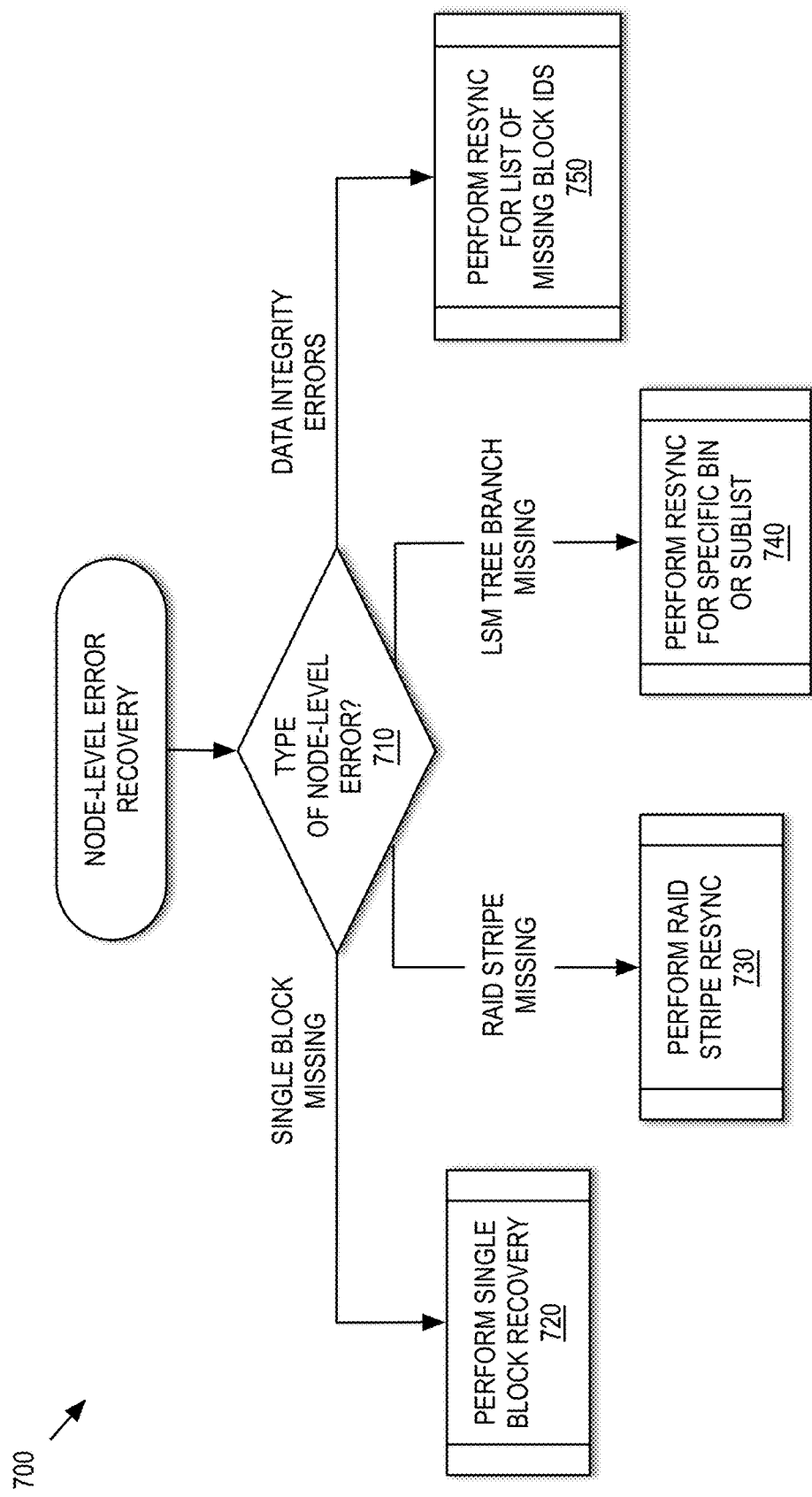
FIG. 7 is a high-level flow diagram illustrating a set of operations for recovering from various types of node-level errors in accordance with one or more embodiments.

FIG. 7 is a high-level flow diagram illustrating a set of operations for performing a process 700 for recovering from various types of node-level errors in accordance with one or more embodiments. Process 700 may be performed by a metadata service (e.g., metadata service 612), for example, responsive to discovering the existence of a node-level error discovered during performance of a read operation on behalf of a client (e.g., application 122) or responsive to receipt of results of a data integrity check (e.g., data integrity check 620).

At decision block 710, the type of node-level error is determined. Non-limiting examples of the types of node-level errors may include a single block being missing, a RAID stripe error, a missing LSM tree branch, and data integrity errors. A single block may be identified and reported/notified to the metadata service as missing, for example, by a KV store (e.g., one of KV stores 616*a-d*) as a result of the loss of the block ID from the KV store or by a block service (e.g., block service 314) due to a check sum verification failure, resulting from damage to the corresponding data. A RAID stripe error may be identified by a RAID layer of the node (e.g., node 605*a-d*) and reported/notified to the metadata service responsive to encountering a threshold number of block errors associated with the same RAID stripe or responsive to loss of more pieces in a stripe than it can tolerate. For example, if a 3+1 RAID 5 stripe, which can survive one piece (or drive) failure, experiences a loss of more than one piece, the RAID stripe cannot be recovered from the local node alone. A missing LSM tree branch may be identified during traversal of an LSM tree within the KV store and reported/notified to the metadata service. For their part, data integrity errors may be identified and reported/notified to the metadata service responsive to data integrity checking performed separate and apart from a garbage collection process or data integrity checking that is integrated with a garbage collection process.

When the node-level error is identified as relating to a single missing block, processing continues with block 720. When the node-level error is determined to be a RAID stripe error, processing continues with block 730. When the node-level error is determined to be a missing branch from an LSM tree, processing continues with block 740. When the node-level error is determined to be a data integrity error, processing continues with block 750.

At block 720, single block recovery is performed. In one embodiment, the node that detected the single missing block need not be treated as a failed node and cluster-level redundancy may be leveraged to recover the missing block as described further below with reference to FIG. 8.

At block 730, RAID stripe resynchronization is performed. In one embodiment, the node that detected the RAID stripe error need not be treated as a failed node and cluster-level redundancy may be leveraged to recover block IDs from the failed RAID stripe as described further below with reference to FIG. 9.

At block 740, resynchronization is performed for one or more specific bins or sublists. In one embodiment, the node that detected the missing LSM tree branch need not be treated as a failed node and cluster-level redundancy may be leveraged to recover the block IDs lost as a result of the missing LSM tree branch as described further below with reference to FIG. 10.

At block 750, resynchronization is performed for a list of missing block IDs. In one embodiment, the node that detected the missing LSM tree branch need not be treated as a failed node and cluster-level redundancy may be leveraged to recover the missing block IDs as described further below with reference to FIG. 11.

Figure 8:
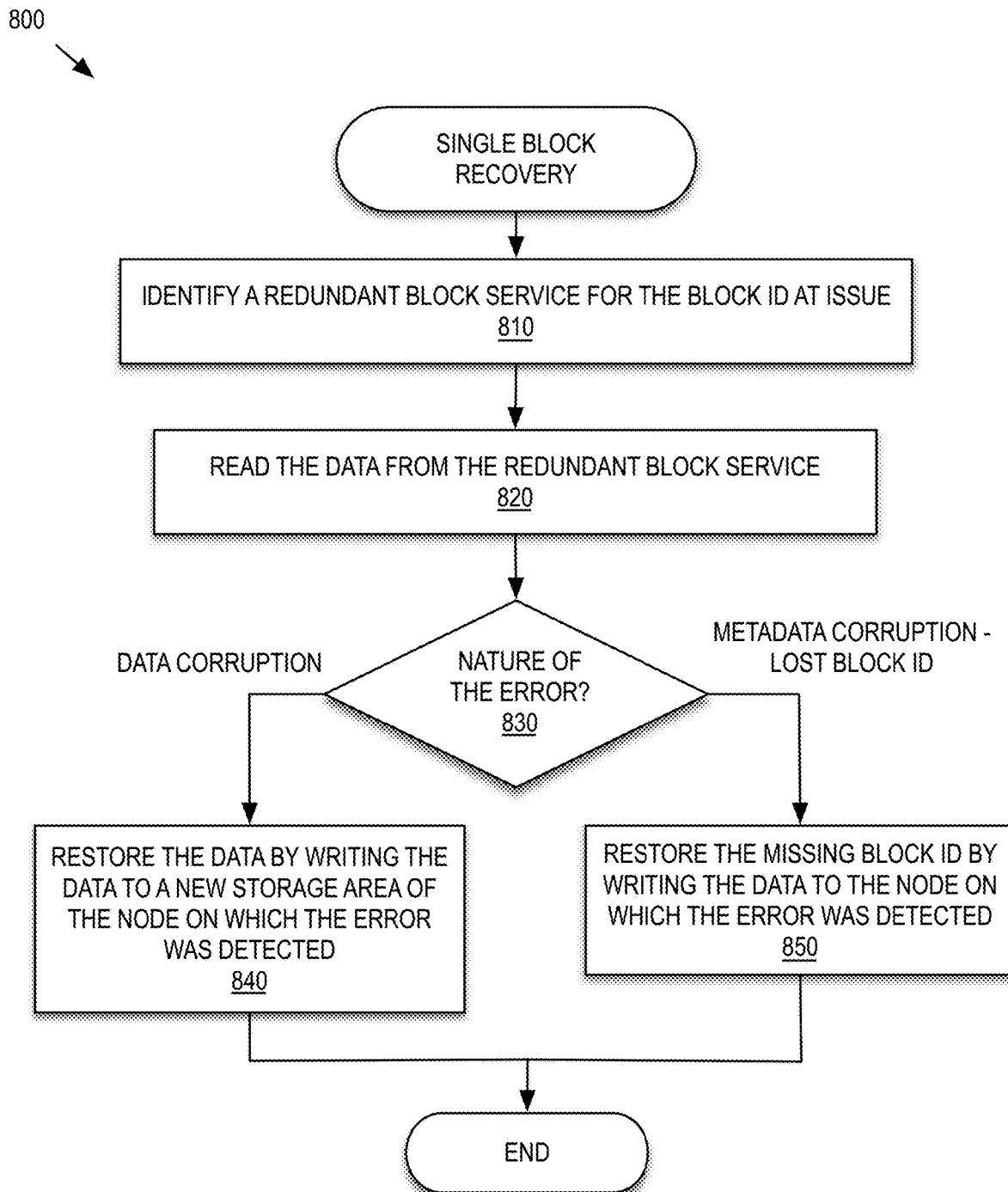
FIG. 8 is a flow diagram illustrating a set of operations for using cluster-level redundancy to perform single block recovery in accordance with one or more embodiments.

FIG. 8 is a flow diagram illustrating a set of operations for using cluster-level redundancy to perform a process 800 single block recovery in accordance with one or more embodiments. Process 800 may represent a non-limiting example of the performance of a single block recovery of block 720 of FIG. 7 by a metadata service (e.g., metadata service 612), for example, responsive to the metadata service being alerted of a block read error by a KV store (e.g., KV store 616*a-d*) or a block service (e.g., block service 314).

At block 810, a redundant block service for the block ID at issue is identified. As noted above, in some embodiments, the higher-order bits (e.g., the first two bytes) of the block ID may be used to map the block ID to a data bucket or bin. These bins may then be assigned to multiple nodes depending upon a replication factor (e.g., 2, 3, etc.) and other factors (e.g., drive sizes, node coupling, etc.). The bin assignments along with additional information (e.g., the replica number and status of the replica) may be maintained within the KV store. Assuming a replication factor of 2, in one embodiment, identification of the redundant block service may be accomplished by retrieving the bin assignments for the block ID at issue and identifying the redundant (secondary) node to which a copy of the data for the block ID at issue has been stored.

At block 820, the data is read from the redundant block service by issuing a read operation for the block ID to the secondary node identified in block 810.

At decision block 830, the nature of the node-level error is determined. When the node-level error relates to data corruption (e.g., a failed checksum verification), processing continues with block 840; otherwise, when the node-level error relates to metadata corruption (e.g., the block ID at issue is missing from the KV store), processing branches to block 850. In one embodiment, the nature of the node-level error may be determined with reference to a response code contained within a response to a read operation returned by the block service to the metadata service. For example, the block service may return an error code indicative of data corruption to the metadata service when a verification of the check sum for the data block fails. Similarly, the block service may return an error code indicative of metadata corruption (e.g., indicating the block ID attempted to be read is missing from the KV store).

At block 840, the data is restored by writing the data read from the redundant (e.g., secondary) block service to a new storage area of the node on which the error was detected. Assuming the data is successfully retrieved from the redundant block service by the metadata service, the metadata service can turn around and rewrite the data back to the block service that is missing the data. In one embodiment the write is marked as non-dedup-able so as to cause the data to be written to a new area of the storage system and metadata is updated with the new location of the data. In this manner, the data is recovered and double helix replication for this block is restored.

At block 850, the missing block ID is restored by writing the data read from the redundant (e.g., secondary) block service to the node on which the error was detected. Assuming the data is successfully retrieved from the redundant block service by the metadata service, the metadata service can turn around and rewrite the data back to the KV store that is missing the block ID via interactions with the block service corresponding to the KV store. In this manner, the missing block ID is reinserted into the KV store.

Figure 9:
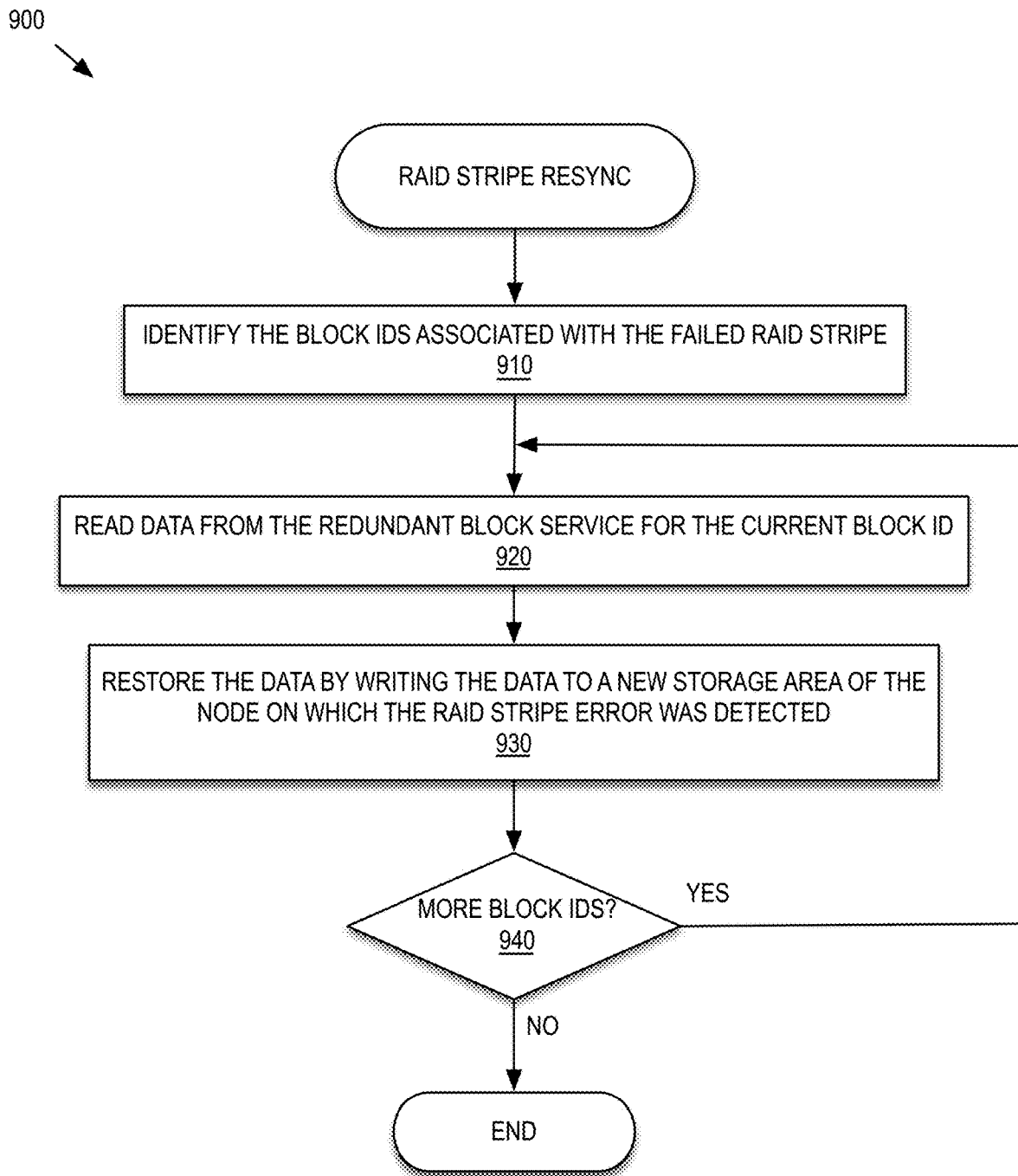
FIG. 9 is a flow diagram illustrating a set of operations for using cluster-level redundancy to perform RAID stripe resynchronization in accordance with one or more embodiments.

FIG. 9 is a flow diagram illustrating a set of operations for using cluster-level redundancy to perform a process 900 of RAID stripe resynchronization in accordance with one or more embodiments. Process 900 may represent a non-limiting example of the performance of a RAID stripe resynchronization of block 730 of FIG. 7 by a metadata service (e.g., metadata service 612), for example, responsive to the metadata service being alerted of a RAID stripe error by a RAID layer of a node (e.g., node 605*a-d*). In the context of the present example, a chunk of a RAID stripe is assumed to have failed that covers the storage areas in which multiple blocks of data have been stored. This type of error may be reported/notified to the metadata service by the KV store of a node to which a read operation has been directed that resulted in a double failure on RAID 5, for example, that affects the data associated with multiple blocks (e.g., block ID$_1$ and block ID$_3$ of FIG. 6C) and that has been reported/notified to the KV store by a RAID layer of the node.

At block 910, the block IDs associated with the failed RAID stripe are identified. Assuming, the KV store includes information regarding the RAID stripe in which respective blocks of data are stored and the metadata (e.g., the block IDs) associated with the blocks of data are stored at another location of the storage that is not affected by the failure, the block IDs of all data blocks presumed to be missing (e.g., associated with the failed RAID stripe) can be identified by the KV store.

At block 920, the data from the redundant block services is read for a current block ID. In one embodiment, the KV store may issue a resynchronization request to the block service for a list of block IDs associated with data blocks presumed to be affected by the RAID stripe error. Responsive to the resynchronization request, the block service may propagate the resynchronization request to the metadata service. The metadata service may then loop through the list of block IDs one at a time, identifying the redundant block service with reference to the bin assignments for the current block ID and reading the data from the redundant block service as described above with reference to FIG. 8.

At 930, the data is restored by writing the data read from the redundant (e.g., secondary) block service to a new storage area of the node on which the error was detected. Assuming the data is successfully retrieved from the redundant block service by the metadata service, the metadata service can then write the data back to KV store that is missing the data via the corresponding block service. In one embodiment the write is marked as non-dedup-able so as to cause the data to be written to a new area of the storage system and metadata is updated with the new location of the data as depicted in FIG. 15.

Figure 15:
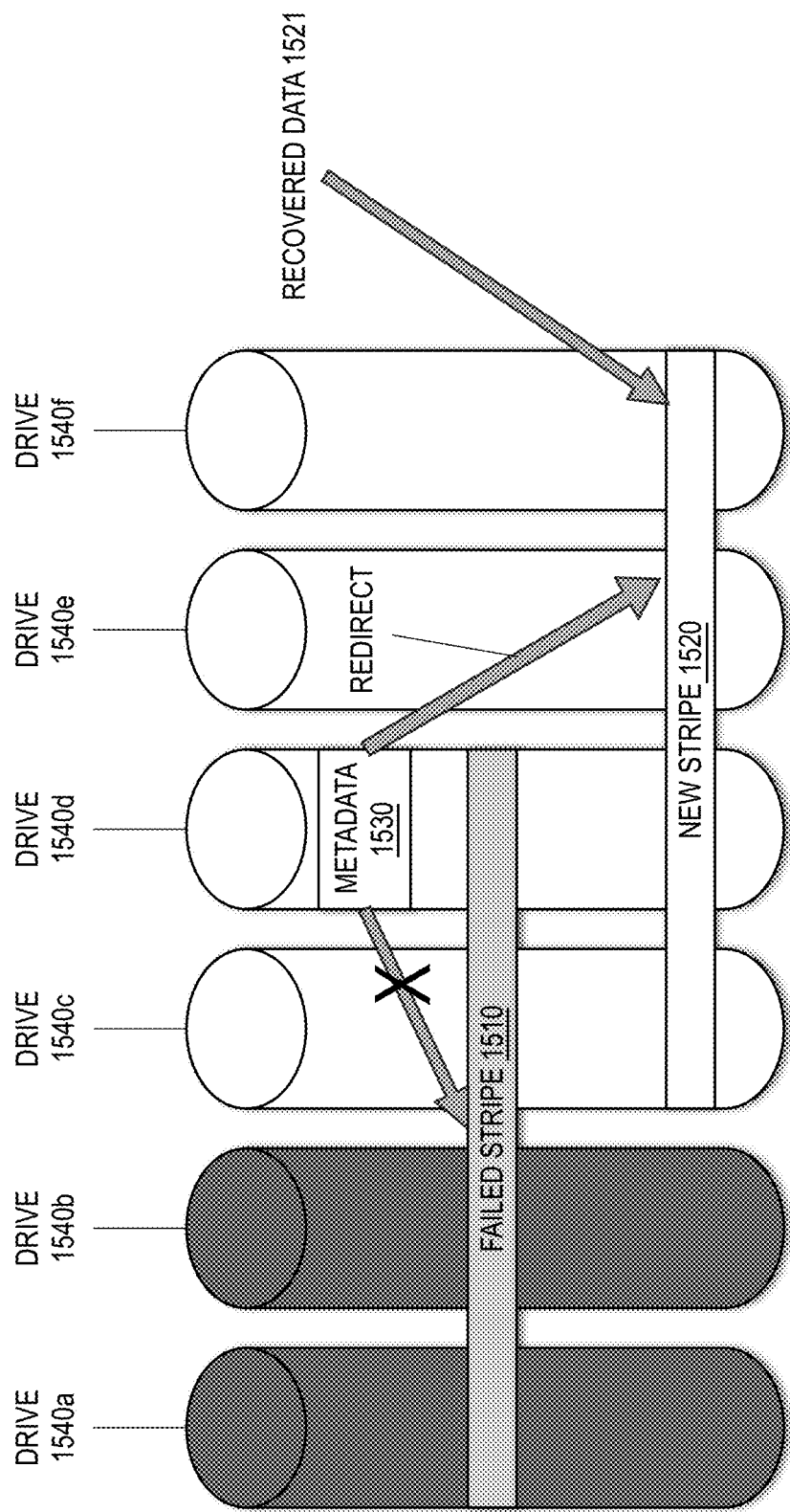
FIG. 15 is a block diagram illustrating use of a journaling system in which data is written sequentially in accordance with one or more embodiments.

FIG. 15 is a block diagram illustrating use of a journaling system in which data is written sequentially in accordance with one or more embodiments. As illustrated in FIG. 15, which depicts multiple drives 1540*a-f*, newer storage systems do not write in place. Instead, new storage systems may make use of a journaling system in which data is written sequentially. So as long as the incoming data (e.g., new data and/or recovered data 1521) is not marked as duplicate, it will be written to the latest RAID stripe write area (e.g., new stripe 1520).

In the context of the present example, drives 1540*a-b* have errors that resulted in a failed stripe 1510 (e.g., containing block A, B, and C). Metadata 1530 previously included information regarding the locations (e.g., LBAs) of the blocks stored within failed stripe 1510 but after recovery of data (e.g., data A and B) associated with the failed stripe 1510, for example, from one or more other nodes within the cluster, metadata 1530 may be updated to so that all subsequent reads to the LBAs are redirected to the new stripe 1520. Depending upon the particular implementation, the old physical data stored in failed stripe 1510 may be marked as garbage and a garbage collection process may reclaim the space for future writes; however, if the old spots on drives 1540*a-b* are physically bad, the drives may have the capability to redirect new writes to respective reserved disk space. This process in which a disk block error is fixed after writes is referred to as recovery-on-writes. If however, the error cannot be fixed, the drive(s) at issue may be treated as failed and excluded from useable node capacity.

Returning to FIG. 9, at decision block 940, it is determined if there are more block IDs to be resynchronized. If the resynchronization request received from the KV store includes one or more additional block IDs, then processing continues with block 920 for the next block ID; otherwise RAID stripe resynchronization is complete.

Figure 10:
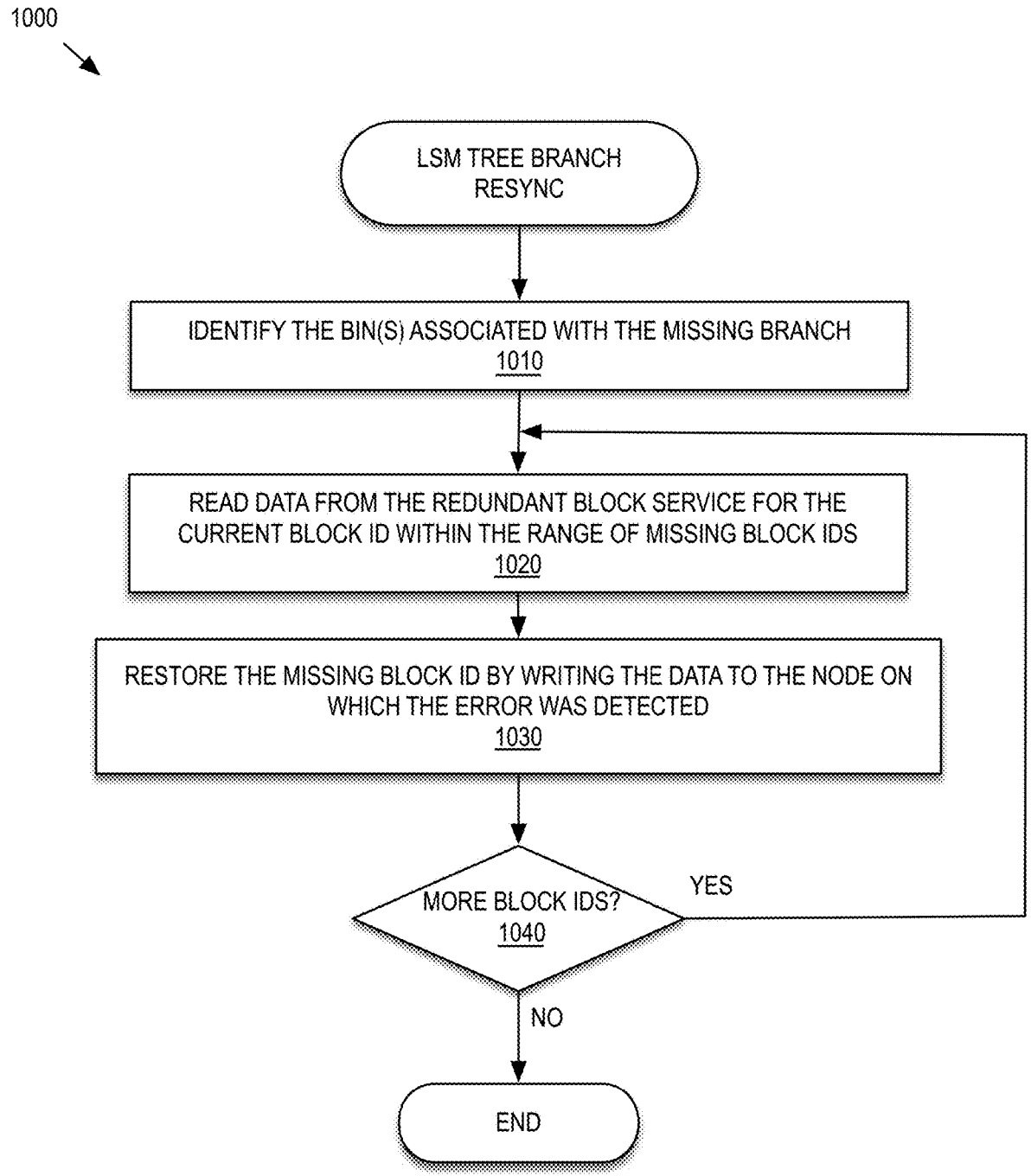
FIG. 10 is a flow diagram illustrating a set of operations for using cluster-level redundancy to perform LSM tree branch resynchronization in accordance with one or more embodiments.

FIG. 10 is a flow diagram illustrating a set of operations for using cluster-level redundancy to perform a process 1000 for LSM tree branch resynchronization in accordance with one or more embodiments. Process 1000 may represent a non-limiting example of the performance of an LSM tree branch resynchronization of block 740 of FIG. 7 by a metadata service (e.g., metadata service 612), for example, responsive to the metadata service being alerted of a missing LSM tree branch by a KV store (e.g., KV store 616*a-d*). In the context of the present example, a chunk of a RAID stripe is assumed to have failed that affects the metadata at the LSM tree level.

At block 1010, the bin(s) or sublist(s) associated with the missing LSM tree branch is/are identified. As each LSM tree branch is associated with respective range of block IDs, the specific block IDs lost may not be known, but the range of block IDs (e.g., the missing bin(s) or sublist(s)) with which the missing block IDS are associated may be determined based on the missing branch of the LSM tree.

At block 1020, the data from the redundant block service for the current block ID within the range of missing block IDs is read. In one embodiment, the KV store may issue a resynchronization request to the block service for a specified set of one or more bins or sublists identified in block 1010. This resynchronization request may be similar to a bin synchronization for the missing bin(s) or sublist(s); however, the resynchronization will be faster than a traditional bin synchronization because it likely involves only a small subset of data. Responsive to the resynchronization request, the block service may propagate the resynchronization request to the metadata service. The metadata service may then loop through the block IDs within the bin(s) or sublist(s) at issue one at a time, identifying the redundant block service with reference to the bin assignments for the current block ID and reading the data from the redundant block service as described above with reference to FIG. 8.

At 1030, the missing block ID is restored by writing the data read from the redundant (e.g., secondary) block service to the node on which the error was detected. Assuming the data is successfully retrieved from the redundant block service by the metadata service, the metadata service can then write the data back to the KV store that is missing the block ID via interactions with the block service corresponding to the KV store. In this manner, the missing block ID is reinserted into the KV store.

At decision block 1040, it is determined if there are more block IDs within the bins or sublists represented by the missing branch of the LSM tree. If the bins or sublists associated with the resynchronization request received from the KV store include one or more additional block IDs, then processing continues with block 1020 for the next block ID; otherwise, the LSM tree branch resynchronization is complete.

Figure 11:
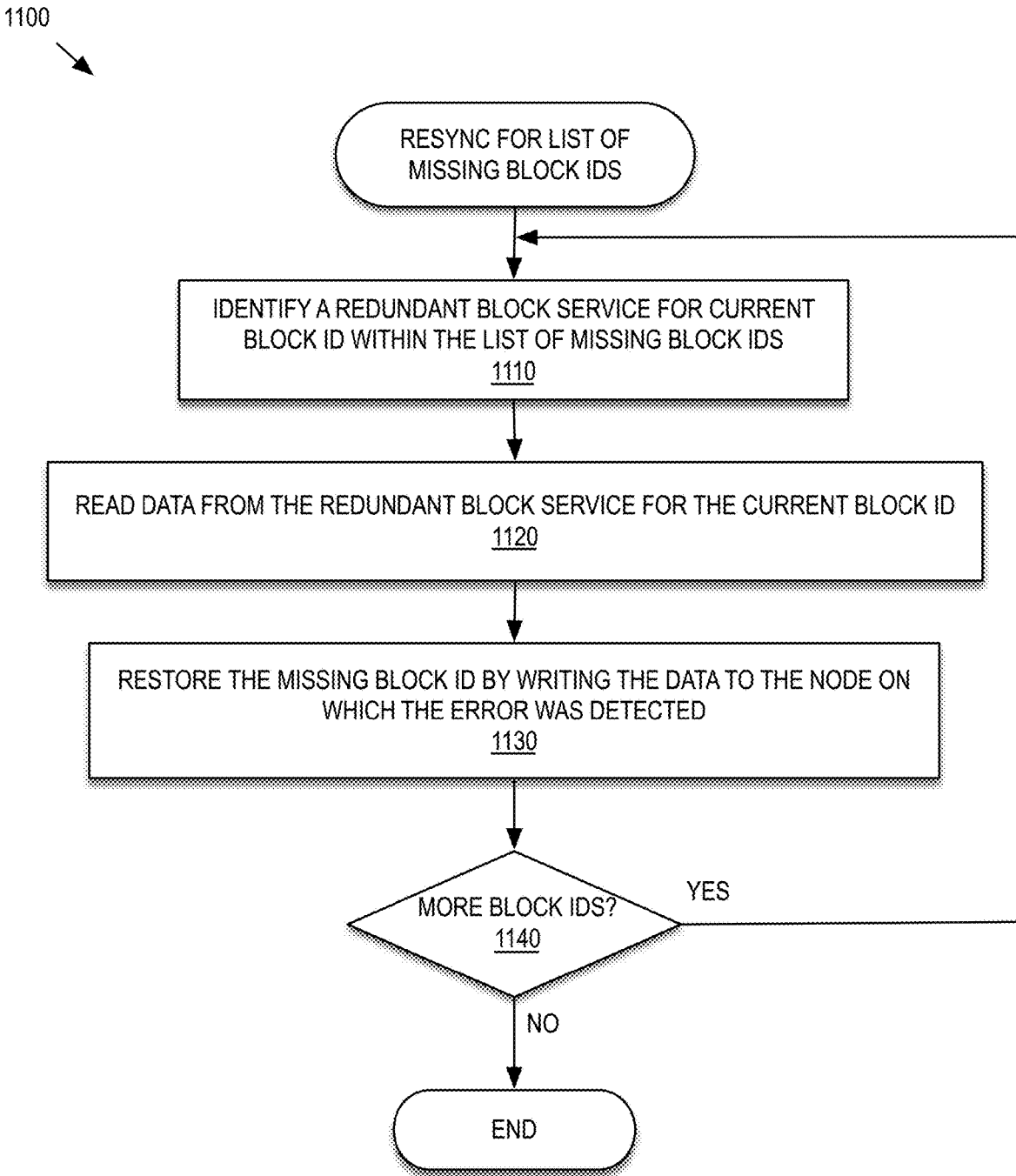
FIG. 11 is a flow diagram illustrating a set of operations for using cluster-level redundancy to perform resynchronization for a list of missing block IDs in accordance with one or more embodiments.

FIG. 11 is a flow diagram illustrating a set of operations for using cluster-level redundancy to perform a process 1100 for resynchronization of a list of missing block IDs in accordance with one or more embodiments. Process 1100 may represent a non-limiting example of the performance of a resynchronization for a list of missing block IDs of block 750 of FIG. 7 by a metadata service (e.g., metadata service 612), for example, responsive to the metadata service being alerted of the missing block IDs within a KV store (e.g., KV store 616a-d) by a block service (e.g., block service 314). In the context of the present example, a list of block IDs has been identified as lost, for example, by the KV store as a result of completion of a data integrity check (e.g., data integrity check 620 of FIG. 6E) or a synergistic combination of garbage collection process and a data integrity check process (e.g., as described with reference to FIGS. 12-14).

At block 1110, a redundant block service for a current block ID within the list of missing block IDs is identified. As noted above, in some embodiments, the higher-order bits (e.g., the first two bytes) of the block ID may be used to map the block ID to a data bucket or bin. These bins may then be assigned to multiple nodes depending upon a replication factor (e.g., 2, 3, etc.) and other factors (e.g., drive sizes, node coupling, etc.). The bin assignments along with additional information (e.g., the replica number and status of the replica) may be maintained within the KV store. Assuming a replication factor of 2, in one embodiment, identification of the redundant block service may be accomplished by retrieving the bin assignments for the block ID at issue and identifying the redundant (secondary) node to which a copy of the data for the block ID at issue has been stored.

At block 1120, the data is read from the redundant block service by issuing a read operation for the block ID to the secondary node identified in block 1110.

At block 1130, the missing block ID is restored by writing the data read from the redundant (e.g., secondary) block service to the node on which the error was detected. Assuming the data is successfully retrieved from the redundant block service by the metadata service, the metadata service can then write the data back to the KV store that is missing the block ID via interactions with the block service corresponding to the KV store. In this manner, the missing block ID is reinserted into the KV store.

At decision block 1140, it is determined if there are more block IDs within the list of missing block IDs. If so, processing continues with block 1120 for the next block ID; otherwise, the resynchronization is complete.

Based on the various examples described above, a recovery approach specifically tailored for the node-level error scenario at issue may be performed, thereby avoiding the "fail fast" approach in which a node is treated as failed in response to observing any node-level error and then performing a generalized recovery approach. In addition, the proposed recovery approach also allows the time consuming and costly performance of RAID recovery/reconstruction to be avoided.

As noted above, the list of missing blocks to be resynchronized during the resynchronization process of FIG. 11 may be created as a result of completion of a data integrity check on a KV store (e.g., KV store 616a-d). Data integrity checking generally refers to an attempt to identify whether block IDs (e.g., computed hash values for the respective data blocks) that should exist within the KV store do in fact exist. As also noted above, the data integrity check may be a process performed independently of garbage collection or a process that is incorporated with the periodic performance of garbage collection. In one embodiment, a first phase of the garbage collection process may include a garbage collection update (or metadata collection phase). The garbage collection update may be responsible for identifying the block IDs of data blocks that have become garbage since the last garbage collection cycle as described below with reference to FIG. 12. A second phase of the garbage collection update may involve combining and deduplicating lists of block IDs identified as being in use by the metadata services and provided to the block services by the metadata services as a result of completion of the first portion of the garbage collection update. A non-limiting example of the second portion of the garbage collection update is described below with reference to FIG. 13. A third phase of the garbage collection update may involve respective KV stores performing comparisons between a sorted list of block IDs within a particular range of block IDs to facilitate marking of block IDs that can be deleted as well as perform data integrity checking for the particular range. A non-limiting example of the third phase of the garbage collection update is described below with reference to FIG. 14.

Figure 12:
FIG. 12 is a flow diagram illustrating a set of operations for performing a garbage collection update process by a metadata service in accordance with one or more embodiments.

FIG. 12 is a flow diagram illustrating a set of operations for performing a garbage collection update process 1200 by a metadata service in accordance with one or more embodiments. The garbage collection update process 1200 may be performed by a metadata service (e.g., metadata service 612). While for sake of clarity and brevity, the garbage collection update process 1200 is described with reference to a single metadata service (e.g., metadata service 612); it is to be appreciated all metadata services within a cluster (e.g., cluster 104) may periodically perform the garbage collection update process 1200. For example, a cluster master service (e.g., cluster master service 302) may trigger performance of the garbage collection update process 1200 in accordance with a schedule maintained by the cluster master service. In one embodiment, the garbage collection update is scheduled to be performed periodically (e.g., every hour) in accordance with a configurable schedule. If the garbage collection process runs longer than cycle, the next garbage collection update may be scheduled to run as soon as the previous garbage collection process finishes or it may be delayed and run, for example, at the next scheduled interval. A subsequent phase of the garbage collection process (e.g., a merge process performed by the KV stores) to reclaim the storage space consumed by the unused data blocks may be performed after the metadata collection within the cycle has been completed. Depending upon the particular implementation, the merge process may take more time than metadata collection as such it may be desirable to perform the metadata collection independent from the merge process. For example, multiple metadata collections may be performed during the garbage collection period and the merge process performed for each bin may pick up the latest copy of the metadata collection for that bin.

At block 1210, the metadata service identifies block IDs that are in use by the volumes that have been assigned to the metadata service. According to one embodiment, this involves performing an LBA walk (e.g., LBA walk 613) through an LBA map (e.g., LBA map 615) maintained by the metadata service for each of its volumes. For example, the metadata service may retrieve a slice file (e.g., metadata object 532) from a slice volume (e.g., metadata volume 534) for each volume and identify the block IDs in use for the volume at issue by looking up the value (e.g., a block ID) corresponding to each key (e.g., an LBA) stored within the slice file.

At block 1220, the block IDs identified in block 1210 may be organized by bin. In one embodiment, a list of block IDs may be created for each bin. For example, based on the higher order bits (e.g., the first two bytes) of the block IDs they may be placed into the appropriate bin list.

At block 1230, the list of block IDs associated with each bin are sorted. As described above, in one embodiment, the KV store (e.g., KV store 516) of each node may include a tree (e.g., tree 536) that may be implemented using an LSM tree. The block IDs may be sorted within the LSM tree. As such, by sorting the block IDs within each bin list consistent with the sorting represented within the LSM tree, range comparisons between in-use block ID ranges and block ID ranges of keys stored within the LSM tree may be facilitated.

At block 1240, each list of block IDs corresponding to each block service may be compressed. In one embodiment, compression of these lists can be used to reduce the amount of metadata transferred via remote procedure call (RPC) messages.

At block 1250 the lists of block IDs are sent to the block services (e.g., block service 612). According to one embodiment, the lists of block IDs are sent to each block service to which the underlying data block was replicated. The nodes to which the lists of block IDs should be sent may be identified with reference to bin-to-node assignments stored within the cluster. In one embodiment, when sending the block IDs, the metadata service may set a flag to indicate whether the list of block ID is the last part in the collection.

Figure 13:
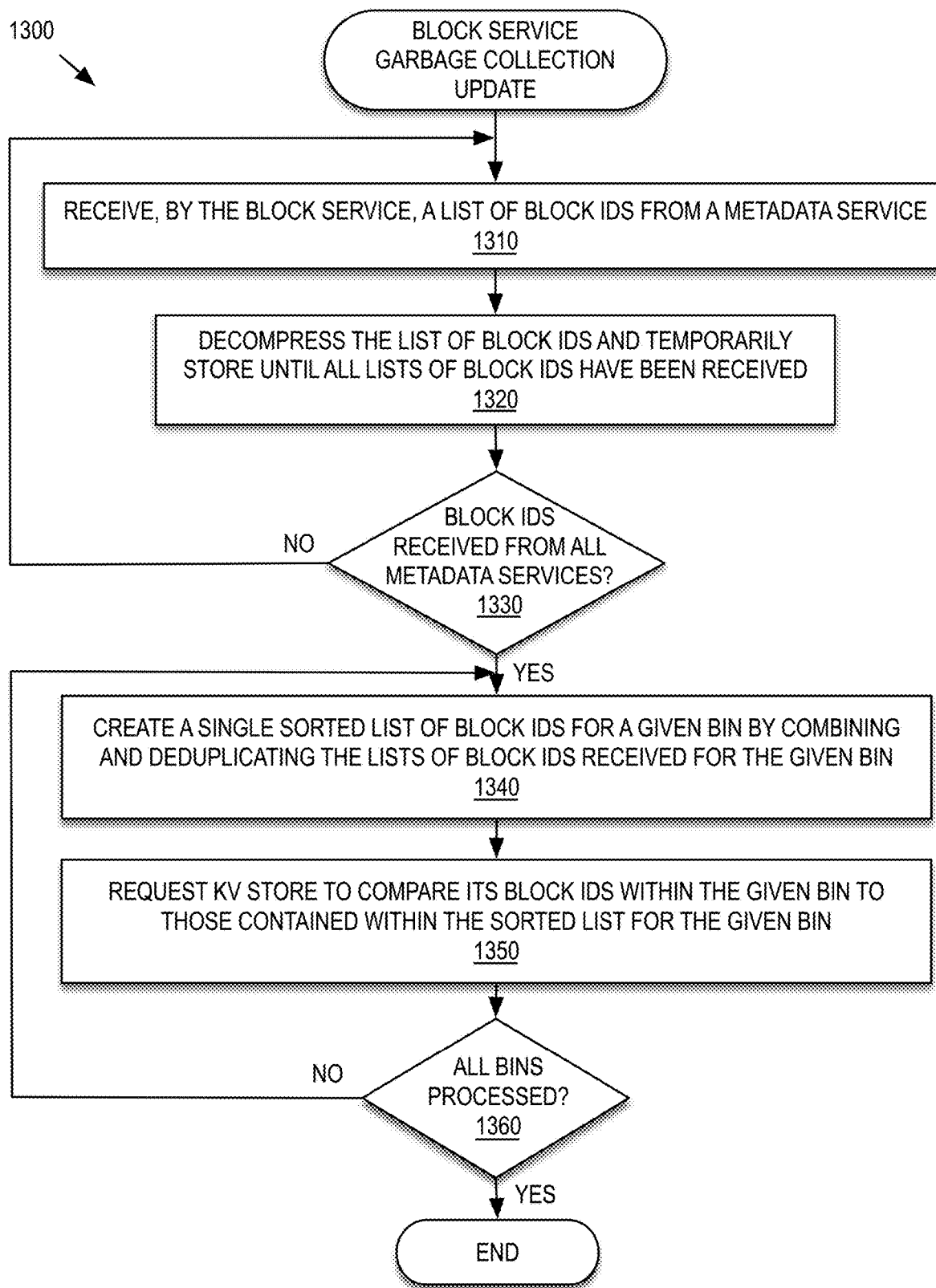
FIG. 13 is a flow diagram illustrating a set of operations for performing a garbage collection update process by a block service in accordance with one or more embodiments.

FIG. 13 is a flow diagram illustrating a set of operations for performing a garbage collection update process 1300 by a block service in accordance with one or more embodiments. The garbage collection update process 1300 may be performed by a block service (e.g., block service 512). While for sake of clarity and brevity, the garbage collection update process is described with reference to a single block service (e.g., block service 512); it is to be appreciated all block services within a cluster (e.g., cluster 104) may periodically perform the garbage collection update process 1300. For example, responsive to triggering of a garbage collection update process (e.g., garbage collection process 1200 of FIG. 12) at the metadata service level by a cluster master service (e.g., cluster master service 302), the sorted and compressed lists of block IDs created for each bin by a metadata service (e.g., metadata service 612) may be transferred to the appropriate block services for further processing and updates to the LSM trees (e.g., trees 536) within KV store (e.g., KV store 516).

At block 1310, the block service receives a list of block IDs from a metadata service, for example, after the metadata service has completed metadata service level garbage collection update processing.

At block 1320, the list of block IDs may be decompressed and temporarily stored until all lists of block IDs have been received. Alternatively, it might be beneficial to store the compressed blocks as is, and only decompress after all blocks are received. For example, the list of compressed or decompressed block IDs may be stored within a metadata volume (e.g., metadata volume 534).

At decision block 1330, it is determined whether the lists of block IDs have been received from all metadata services. If so, processing continues with block 1340; otherwise, processing loops back to block 1310. This determination may be made based on the number of metadata services within the cluster and the bins assigned to the particular node on which the block service is running. In one embodiment, at the beginning of the garbage collection process, each block service may keep a record of how many metadata services are participating in the garbage collection process. In this manner, each block service may then expect to receive block IDs from all of those in the record. In one embodiment, the metadata services may set a flag to identify the last list of block IDs in the collection and this flag may be used by the block service to know it is done receiving block IDs from a particular metadata service.

In the context of the current example, at this point, the block service may now start processing one bin at a time by performing blocks 1340 and 1350. At block 1340, a single sorted list of block IDs may be created for a given bin by combining and deduplicating the lists of block IDs received for the given bin. It is to be appreciated in view of the metadata and data redundancy that may be implemented in accordance with various examples, the block service may receive multiple lists of block IDs for a given bin. For example, assuming a redundancy factor of 2 for metadata and data, each volume may be assigned to two different metadata services within the cluster and each data block may be persisted via two different block services within the cluster. In such a redundancy configuration, the block service should expect to receive two lists of block IDs for each bin.

At block 1350, the block service may issue a request to the KV store to compare its block IDs within the given bin to those contained within the sorted list for the given bin.

At decision block 1360, it is determined whether all bins have been processed. If so, processing is complete; otherwise, processing loops back to block 1340. This determination may be made with reference to the bins assigned to the node on which the block service is running. A non-limiting example of the block ID range comparison is described below with reference to FIG. 14.

Figure 14:
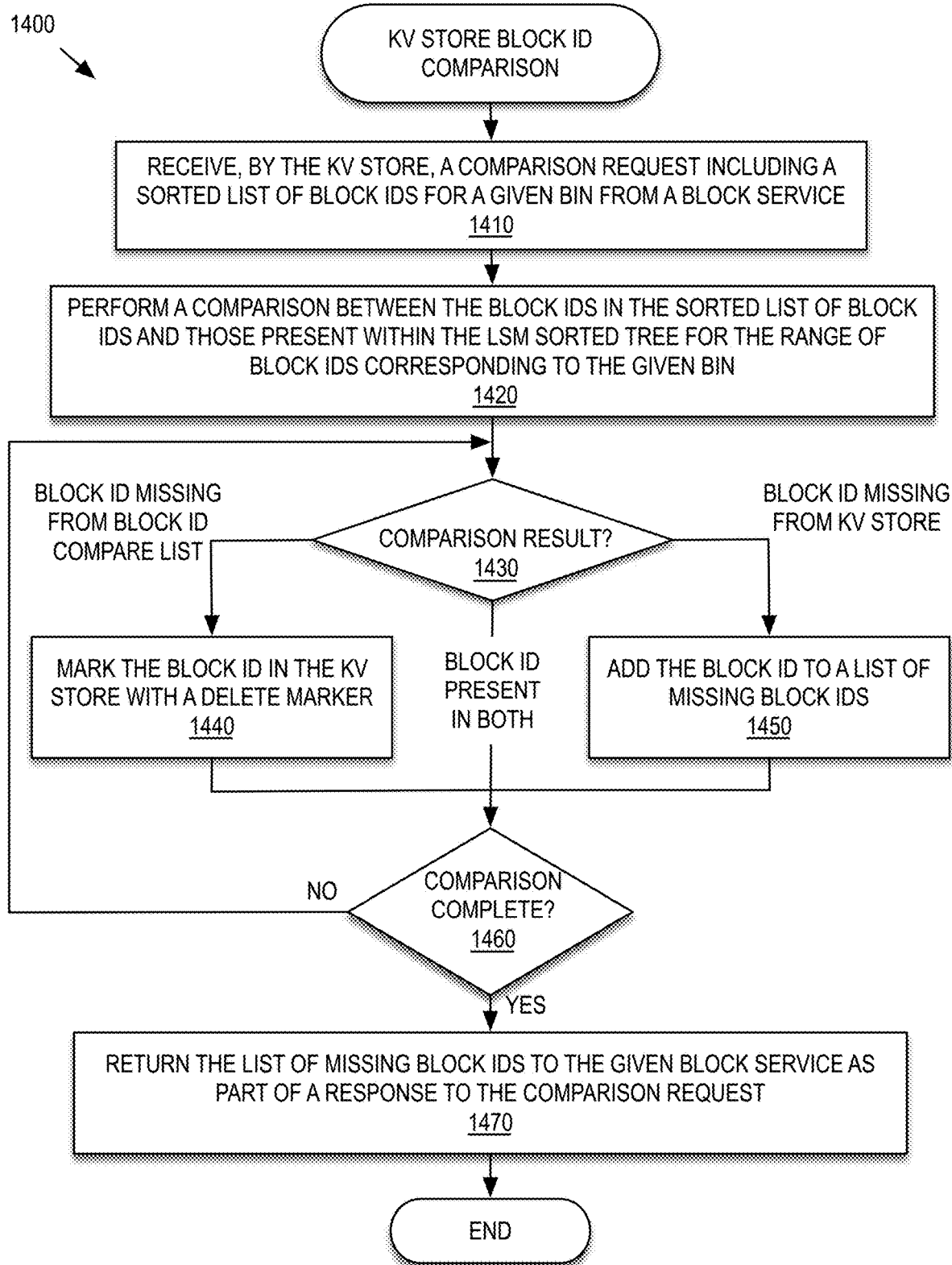
FIG. 14 is a flow diagram illustrating a set of operations for performing a block identifier range comparison process by a KV store in accordance with one or more embodiments.

FIG. 14 is a flow diagram illustrating a set of operations for performing a block identifier range comparison process 1400 by a KV store (e.g., KV store 516) in accordance with one or more embodiments. The block ID range comparison process 1400 may be performed by the KV store responsive to a request issued by a block service (e.g., block service 512), for example, as part of a garbage collection update process (e.g., garbage collection process 1300 of FIG. 13) at the block service level.

At block 1410, the KV store receives a comparison request (e.g., the request issued at block 1350 of FIG. 13) including a sorted list of block IDs for a given bin from a given block service.

At block 1420, the KV store performs a comparison between the block IDs in the sorted list of block IDs (which may be referred to herein as the block ID compare list) and those present within the LSM sorted tree for the range of block IDs corresponding to the given bin. The comparison may be performed for each block ID in the range of block IDs for the given bin that is present within either of the block ID compare list or within the LSM sorted tree.

At decision block 1430, a comparison result for a particular block ID is determined. If the particular block ID is present in the KV store but is missing from the block ID compare list, the corresponding data block represents garbage to be collected and processing continues with block 1440. If the particular block ID is present in the block ID compare list but missing from the KV store, a data integrity error exists and processing continues with block 1450. If the particular block ID is present in both the block ID compare list and the KV store, no action need be taken for the particular block ID as no data integrity error has been identified and the corresponding data block does not represent garbage. In view of the foregoing, it should be appreciated, as a result of making use of block IDs rather than an intermediate probabilistic data structure (e.g., a Bloom filter) for garbage collection, data integrity checking can be performed concurrently almost for free.

At block 1440, garbage has been identified and the block ID may be marked in the KV store with a delete marker. In one embodiment, the delete marker eventually triggers a merge process performed by the LSM tree. For example, the garbage may be delay collected with the hope that other data blocks near the one just marked will also become garbage so as to allow more efficient reclamation of space at once. Alternatively, the space reclamation may be performed on a block-by-block basis.

At block 1450, a data integrity error has been identified and the block ID is added to a list of missing block IDs.

At decision block 1460, it is determined whether the range comparison is complete. If so, processing continues with block 1470; otherwise, processing loops back to decision block 1430.

At block 1470, the list of missing block IDs is returned to the given block service as part of a response to the comparison request received at block 1410.

Responsive to receiving the missing block IDs, the given block service may check to see if a redundant block service has the block ID; and if so, may copy the data block from the redundant block service and rewrite it back to the KV store to address the discovered data integrity error. To the extent this type of remediation is expected to be performed responsive to the block ID comparison process 1400, prior to the given block service issuing the comparison request to the KV store, the given block service should lock the range of block IDs so as to prevent any new writes within that range from coming into the KV store and should unlock the range of block IDs upon completion of the remediation. In this manner, an accidental drop of a re-written data block may be prevented by guaranteeing the drop and write are sequenced in the correct order so as to prevent data loss.

While in the context of the examples of FIGS. 7-14, a number of enumerated blocks are included, it is to be understood that examples may include additional blocks before, after, and/or in between the enumerated blocks. Similarly, in some examples, one or more of the enumerated blocks may be omitted or performed in a different order.

It is also to be appreciated while the block IDs are organized into bins in the context of the examples of FIGS. 12-14, the block IDs may alternatively be grouped in accordance with other granularities. For example, block IDs may be organized by sublists within the bins based on additional higher order bits (e.g., 6 bytes) following those mapping the block IDs to a bin.

Additionally, although the above examples are explained with reference to the use of full block IDs, it is to be appreciated truncated block IDs may alternatively be used, for example, in an implementation that desires to reduce the amount of overall metadata transfer. In some implementations, whether to use truncated or full block IDs may be dynamically determined for each cycle of garbage collection based on configurable criteria. For example, if the distributed storage system is busy, the garbage collection process may be run with truncated block IDs and the degree of truncation (e.g., the number of bits dropped from the block IDs) may be increased the busier the system is. Similarly, when the system is idle or during the night, for example, the garbage collection process may be run with full block IDs. Other options may include running the garbage collection processes each day (or another predetermined or configurable interval) with truncated block IDs and running the garbage collection process each week (or another predetermined or configurable interval) with full blocks IDs.

As those skilled in the art will appreciate, the use of truncated block IDs may result in the inability to identify the exact block ID that is missing. For example a truncated block ID of a different block may match the truncated missing block ID. Therefore, when truncated block IDs are used, the recovery might rely more on bin and/or sublist-level synchronization, instead of single block recovery.

Various components of the present embodiments described herein may include hardware, software, or a combination thereof. Accordingly, it may be understood that in other embodiments, any operation of the distributed storage management system 100 in FIG. 1 or one or more of its components thereof may be implemented using a computing system via corresponding instructions stored on or in a non-transitory computer-readable medium accessible by a processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and RAM.

The various systems and subsystems (e.g., protocol subsystem 112, data management subsystem 114, storage management subsystem 116, cluster management subsystem 118, and data mover subsystem 120), and/or nodes 105 (when represented in virtual form) of the distributed storage management system described herein, and the processing described with reference to the flow diagrams of FIGS. 7-14 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems (e.g., servers, network storage systems or appliances, blades, etc.) of various forms, such as the computer system described with reference to FIG. 16 below.

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 16:
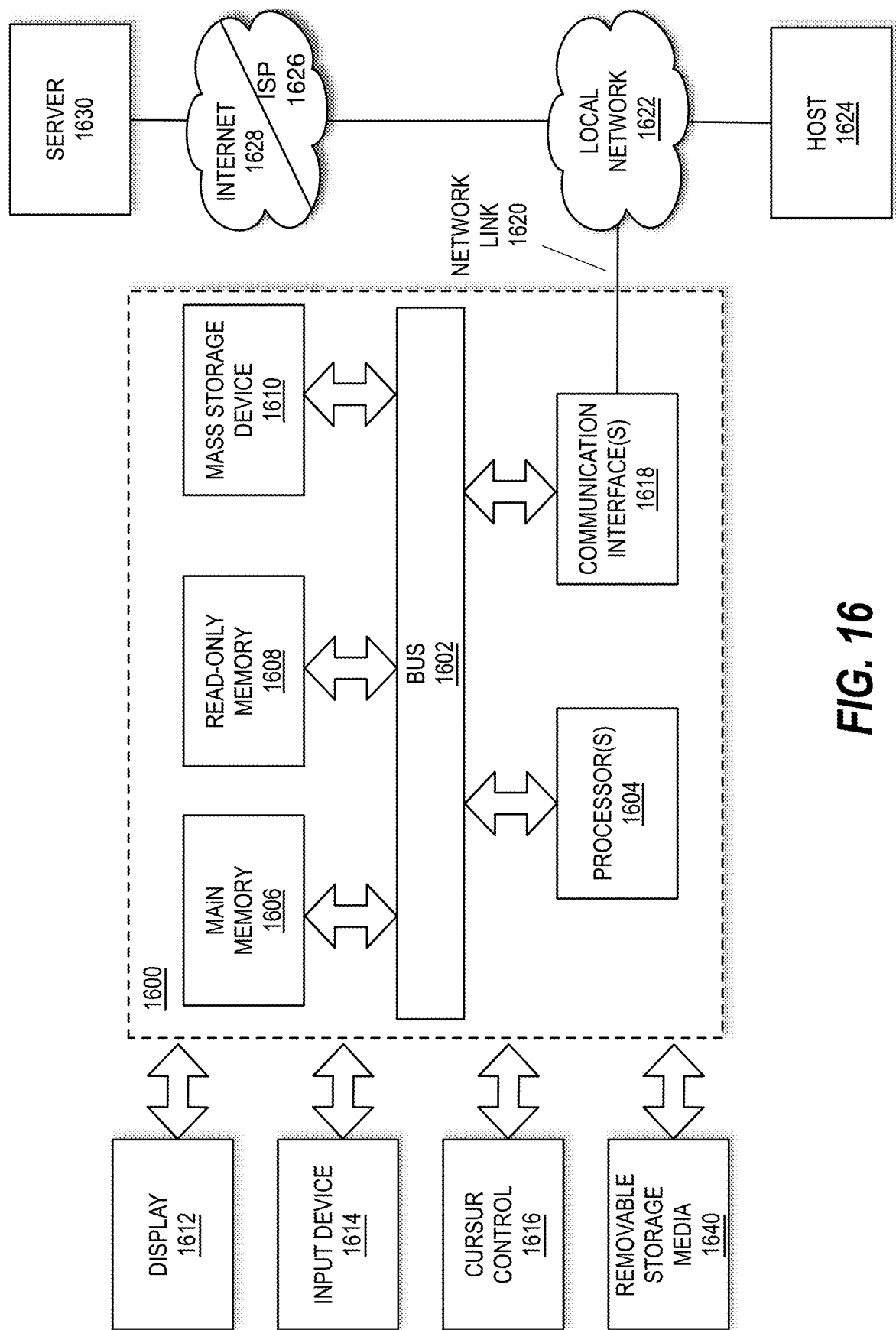
FIG. 16 is a block diagram illustrating a computer system in which or with which one or more embodiments of the present disclosure may be implemented.

FIG. 16 is a block diagram that illustrates a computer system 1600 in which or with which an embodiment of the present disclosure may be implemented. Computer system 1600 may be representative of all or a portion of the computing resources associated with a node of nodes 105 of a distributed storage management system (e.g., distributed storage management system 100 or 400) or may be representative of all or a portion of a heterogenous resource made available for use by the distributed storage management system. Notably, components of computer system 1600 described herein are meant only to exemplify various possibilities. In no way should example computer system 1600 limit the scope of the present disclosure. In the context of the present example, computer system 1600 includes a bus 1602 or other communication mechanism for communicating information, and a processing resource (e.g., a hardware processor 1604) coupled with bus 1602 for processing information. Hardware processor 1604 may be, for example, a general-purpose microprocessor.

Computer system 1600 also includes a main memory 1606, such as a random-access memory (RAM) or other dynamic storage device, coupled to bus 1602 for storing information and instructions to be executed by processor 1604. Main memory 1606 also may be used for storing temporary variables or other intermediate information during execution of instructions to be executed by processor 1604. Such instructions, when stored in non-transitory storage media accessible to processor 1604, render computer system 1600 into a special-purpose machine that is customized to perform the operations specified in the instructions.

Computer system 1600 further includes a read only memory (ROM) 1608 or other static storage device coupled to bus 1602 for storing static information and instructions for processor 1604. A storage device 1610, e.g., a magnetic disk, optical disk or flash disk (made of flash memory chips), is provided and coupled to bus 1602 for storing information and instructions.

Computer system 1600 may be coupled via bus 1602 to a display 1612, e.g., a cathode ray tube (CRT), Liquid Crystal Display (LCD), Organic Light-Emitting Diode Display (OLED), Digital Light Processing Display (DLP) or the like, for displaying information to a computer user. An input device 1614, including alphanumeric and other keys, is coupled to bus 1602 for communicating information and command selections to processor 1604. Another type of user input device is cursor control 1616, such as a mouse, a trackball, a trackpad, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane.

Removable storage media 1640 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 1600 may implement the techniques described herein using customized hard-wired logic, one or more ASICs or FPGAs, firmware or program logic which in combination with the computer system causes or programs computer system 1600 to be a special-purpose machine. According to one embodiment, the techniques herein are performed by computer system 1600 in response to processor 1604 executing one or more sequences of one or more instructions contained in main memory 1606. Such instructions may be read into main memory 1606 from another storage medium, such as storage device 1610. Execution of the sequences of instructions contained in main memory 1606 causes processor 1604 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 1610. Volatile media includes dynamic memory, such as main memory 1606. Common forms of storage media include, for example, a flexible disk, a hard disk, a solid-state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1602. Transmission media can also take the form of acoustic or light waves, such as those generated during radio-wave and infra-red data communications.

Various forms of media may be involved in carrying one or more sequences of one or more instructions to processor 1604 for execution. For example, the instructions may initially be carried on a magnetic disk or solid-state drive of a remote computer. The remote computer can load the instructions into its dynamic memory and send the instructions over a telephone line using a modem. A modem local to computer system 1600 can receive the data on the telephone line and use an infra-red transmitter to convert the data to an infra-red signal. An infra-red detector can receive the data carried in the infra-red signal and appropriate circuitry can place the data on bus 1602. Bus 1602 carries the data to main memory 1606, from which processor 1604 retrieves and executes the instructions. The instructions received by main memory 1606 may optionally be stored on storage device 1610 either before or after execution by processor 1604.

Computer system 1600 also includes a communication interface 1618 coupled to bus 1602. Communication interface 1618 provides a two-way data communication coupling to a network link 1620 that is connected to a local network 1622. For example, communication interface 1618 may be an integrated services digital network (ISDN) card, cable modem, satellite modem, or a modem to provide a data communication connection to a corresponding type of telephone line. As another example, communication interface 1618 may be a local area network (LAN) card to provide a data communication connection to a compatible LAN. Wireless links may also be implemented. In any such implementation, communication interface 1618 sends and receives electrical, electromagnetic or optical signals that carry digital data streams representing various types of information.

Network link 1620 typically provides data communication through one or more networks to other data devices. For example, network link 1620 may provide a connection through local network 1622 to a host computer 1624 or to data equipment operated by an Internet Service Provider (ISP) 1626. ISP 1626 in turn provides data communication services through the worldwide packet data communication network now commonly referred to as the "Internet" 1628. Local network 1622 and Internet 1628 both use electrical, electromagnetic or optical signals that carry digital data streams. The signals through the various networks and the signals on network link 1620 and through communication interface 1618, which carry the digital data to and from computer system 1600, are example forms of transmission media.

Computer system 1600 can send messages and receive data, including program code, through the network(s), network link 1620 and communication interface 1618. In the Internet example, a server 1630 might transmit a requested code for an application program through Internet 1628, ISP 1626, local network 1622 and communication interface 1618. The received code may be executed by processor 1604 as it is received, or stored in storage device 1610, or other non-volatile storage for later execution.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes a method comprising: managing, by a key-value (KV) store of a first node of a plurality of nodes of a cluster of a distributed storage management system, storage of data blocks as values and corresponding block identifiers (IDs) as keys by implementing a tree in which each branch of a plurality of branches of the tree includes a range of block IDs; and responsive to identifying a missing branch of the plurality of branches, causing a branch resynchronization process to be performed, including for each block ID in the range of block IDs of the missing branch: reading a data block corresponding to the block ID from a second node of the plurality of nodes that maintains redundant information relating to the block ID; and restoring the block ID within the KV store by writing the data block to the first node.

Example 2 includes the subject matter of Example 1, wherein the range of block IDs includes one or more bins each representing a subset of block IDs in the range of block IDs, wherein each of the one or more bins are assigned to a block service running on the first node and a respective redundant block service within the cluster, and wherein the block service and the respective redundant block service are operable to store and retrieve data blocks associated with the assigned bins based on their respective block IDs.

Example 3 includes the subject matter of Examples 1-2, wherein bin assignments are indicative of the assignment of each of the one or more bins to the block service and the respective redundant block service are maintained by the KV store.

Example 4 includes the subject matter of Examples 1-3, further comprising identifying the respective redundant block service based on a bin of the one or more bins with which the block ID is associated, wherein an association between a given block ID and a given bin is determined based on a plurality of most significant bits of the given block ID.

Example 5 includes the subject matter of Examples 1-4, further comprising identifying the one or more bins associated with the missing branch.

Example 6 includes the subject matter of Examples 1-5, wherein the KV store maintains the keys and the values separately within different files of underlying volumes and wherein the tree comprises a log-structured merge tree.

Some embodiments pertain to Example 7 that includes a non-transitory machine readable medium storing instructions, which when executed by a processing resource of a first node of a plurality of nodes of a cluster of a distributed storage management system, cause the first node to: manage with a key-value (KV) store storage of data blocks as values and corresponding block identifiers (IDs) as keys by implementing a tree in which each branch of a plurality of branches of the tree includes a range of block IDs; and responsive to identifying a missing branch of the plurality of branches, cause a branch resynchronization process to be performed, including for each block ID in the range of block IDs of the missing branch: reading a data block corresponding to the block ID from a second node of the plurality of nodes that maintains redundant information relating to the block ID; and restoring the block ID within the KV store by writing the data block to the first node.

Example 8 includes the subject matter of Example 7, wherein the range of block IDs includes one or more bins each representing a subset of block IDs in the range of block IDs, wherein each of the one or more bins are assigned to a block service running on the first node and a respective redundant block service within the cluster, and wherein the block service and the respective redundant block service are operable to store and retrieve data blocks associated with the assigned bins based on their respective block IDs.

Example 9 includes the subject matter of Examples 7-8, wherein bin assignments are indicative of the assignment of each of the one or more bins to the block service and the respective redundant block service are maintained by the KV store.

Example 10 includes the subject matter of Examples 7-9, wherein the instructions further cause the first node to identify the respective redundant block service based on a bin of the one or more bins with which the block ID is associated, and wherein an association between a given block ID and a given bin is determined based on a plurality of most significant bits of the given block ID.

Example 11 includes the subject matter of Examples 7-10, wherein the instructions further cause the first node to identify the one or more bins associated with the missing branch.

Example 12 includes the subject matter of Examples 7-11, wherein the missing branch is identified as a result of attempting to perform a read operation on behalf of a client of the cluster for a block ID in the range of block IDs of the missing branch.

Example 13 includes the subject matter of Examples 7-12, wherein the KV store maintains the keys and the values separately within different files of underlying volumes.

Example 14 includes the subject matter of Examples 7-13, wherein the tree comprises a log-structured merge tree.

Some embodiments pertain to Example 15 that includes a distributed storage management system comprising: a processing resource; and a non-transitory computer-readable medium, coupled to the processing resource, having stored therein instructions that when executed by the processing resource cause a first node of a plurality of nodes of a cluster of the distributed storage management system to: manage with a key-value (KV) store storage of data blocks as values and corresponding block identifiers (IDs) as keys by implementing a tree in which each branch of a plurality of branches of the tree includes a range of block IDs; and responsive to identifying a missing branch of the plurality of branches, cause a branch resynchronization process to be performed including for each block ID in the range of block IDs of the missing branch: reading a data block corresponding to the block ID from a second node of the plurality of nodes that maintains redundant information relating to the block ID; and restoring the block ID within the KV store by writing the data block to the first node.

Example 16 includes the subject matter of Example 15, wherein the range of block IDs includes one or more bins each representing a subset of block IDs in the range of block IDs, wherein each of the one or more bins are assigned to a block service running on the first node and a respective redundant block service within the cluster, and wherein the block service and the respective redundant block service are operable to store and retrieve data blocks associated with the assigned bins based on their respective block IDs.

Example 17 includes the subject matter of Examples 15-16, wherein bin assignments indicative of the assignment of each of the one or more bins to the block service and the respective redundant block service are maintained by the KV store.

Example 18 includes the subject matter of Examples 15-17, wherein the instructions further cause the first node to identify the respective redundant block service based on a bin of the one or more bins with which the block ID is associated, and wherein an association between a given block ID and a given bin is determined based on a plurality of most significant bits of the given block ID.

Example 19 includes the subject matter of Examples 15-18, wherein the instructions further cause the first node to identify the one or more bins associated with the missing branch.

Example 20 includes the subject matter of Examples 15-19, wherein the KV store maintains the keys and the values separately within different files of underlying volumes and wherein the tree comprises a log-structured merge tree.

Some embodiments pertain to Example 21 that includes an apparatus that implements or performs a method of any of Examples 1-6.

Example 22 includes at least one machine-readable medium comprising a plurality of instructions, when executed on a computing device, implement or perform a method or realize an apparatus as described in any preceding Example.

Example 23 includes an apparatus comprising means for performing a method as claimed in any of Examples 1-6.

All examples and illustrative references are non-limiting and should not be used to limit the applicability of the proposed approach to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A non-transitory machine readable medium storing instructions, which when executed by one or more processing resources of a first node of a plurality of nodes of a cluster of a distributed storage management system, cause the first node to:
  manage with a key-value (KV) store storage of data blocks as values and corresponding block identifiers (IDs) as keys by implementing a tree in which each branch of a plurality of branches of the tree is associated with a respective range of block IDs; and after identifying a missing branch of the plurality of branches, cause a branch resynchronization process to be performed, including for each block ID in the respective range of block IDs of the missing branch:
reading a data block corresponding to the block ID from a second node of the plurality of nodes that maintains redundant information relating to the block ID; and
restoring the block ID within the KV store by writing the data block to the first node.

2. The non-transitory machine readable medium of claim 1, wherein the respective range of block IDs of the missing branch includes one or more bins each representing a subset of block IDs in the respective range of block IDs of the missing branch, wherein each of the one or more bins are assigned to a block service running on the first node and a respective redundant block service within the cluster, and wherein the block service and the respective redundant block service are operable to store and retrieve data blocks associated with the assigned bins based on their respective block IDs.

3. The non-transitory machine readable medium of claim 2, wherein bin assignments are indicative of the assignment of each of the one or more bins to the block service and the respective redundant block service are maintained by the KV store.

4. The non-transitory machine readable medium of claim 3, wherein the instructions further cause the first node to identify the respective redundant block service based on a bin of the one or more bins with which the block ID is associated, and wherein an association between a given block ID and a given bin is determined based on a plurality of most significant bits of the given block ID.

5. The non-transitory machine readable medium of claim 2, wherein the instructions further cause the first node to identify the one or more bins associated with the missing branch.

6. The non-transitory machine readable medium of claim 1, wherein the missing branch is identified as a result of attempting to perform a read operation on behalf of a client of the cluster for a block ID in the respective range of block IDs of the missing branch.

7. The non-transitory machine readable medium of claim 1, wherein the KV store maintains the keys and the values separately within different files of underlying volumes.

8. The non-transitory machine readable medium of claim 1, wherein the tree comprises a log-structured merge tree.

9. A method comprising:
managing, by a key-value (KV) store of a first node of a plurality of nodes of a cluster of a distributed storage management system, storage of data blocks as values and corresponding block identifiers (IDs) as keys by implementing a tree in which each branch of a plurality of branches of the tree is associated with a respective range of block IDs; and
after identifying a missing branch of the plurality of branches, causing a branch resynchronization process to be performed, including for each block ID in the respective range of block IDs of the missing branch:
reading a data block corresponding to the block ID from a second node of the plurality of nodes that maintains redundant information relating to the block ID; and
restoring the block ID within the KV store by writing the data block to the first node.

10. The method of claim 9, wherein the respective range of block IDs of the missing branch includes one or more bins each representing a subset of block IDs in the respective range of block IDs of the missing branch, wherein each of the one or more bins are assigned to a block service running on the first node and a respective redundant block service within the cluster, and wherein the block service and the respective redundant block service are operable to store and retrieve data blocks associated with the assigned bins based on their respective block IDs.

11. The method of claim 10, wherein bin assignments are indicative of the assignment of each of the one or more bins to the block service and the respective redundant block service are maintained by the KV store.

12. The method of claim 11, further comprising identifying the respective redundant block service based on a bin of the one or more bins with which the block ID is associated, wherein an association between a given block ID and a given bin is determined based on a plurality of most significant bits of the given block ID.

13. The method of claim 11, further comprising identifying the one or more bins associated with the missing branch.

14. The method of claim 9, wherein the KV store maintains the keys and the values separately within different files of underlying volumes and wherein the tree comprises a log-structured merge tree.

15. A distributed storage management system comprising:
one or more processing resources; and
a non-transitory computer-readable medium, coupled to the one or more processing resources, having stored therein instructions that when executed by the processing resource cause a first node of a plurality of nodes of a cluster of the distributed storage management system to:
manage with a key-value (KV) store storage of data blocks as values and corresponding block identifiers (IDs) as keys by implementing a tree in which each branch of a plurality of branches of the tree is associated with a respective range of block IDs; and
after identifying a missing branch of the plurality of branches, cause a branch resynchronization process to be performed including for each block ID in the respective range of block IDs of the missing branch:
reading a data block corresponding to the block ID from a second node of the plurality of nodes that maintains redundant information relating to the block ID; and
restoring the block ID within the KV store by writing the data block to the first node.

16. The distributed storage management system of claim 15, wherein the respective range of block IDs of the missing branch includes one or more bins each representing a subset of block IDs in the respective range of block IDs of the missing branch, wherein each of the one or more bins are assigned to a block service running on the first node and a respective redundant block service within the cluster, and wherein the block service and the respective redundant block service are operable to store and retrieve data blocks associated with the assigned bins based on their respective block IDs.

17. The distributed storage management system of claim 16, wherein bin assignments indicative of the assignment of each of the one or more bins to the block service and the respective redundant block service are maintained by the KV store.

18. The distributed storage management system of claim 17, wherein the instructions further cause the first node to identify the respective redundant block service based on a bin of the one or more bins with which the block ID is associated, and wherein an association between a given block ID and a given bin is determined based on a plurality of most significant bits of the given block ID.

19. The distributed storage management system of claim 16, wherein the instructions further cause the first node to identify the one or more bins associated with the missing branch.

20. The distributed storage management system of claim 15, wherein the KV store maintains the keys and the values separately within different files of underlying volumes and wherein the tree comprises a log-structured merge tree.

21. The method of claim 9, wherein the missing branch is identified as a result of attempting to perform a read operation on behalf of a client of the cluster for a block ID in the respective range of block IDs of the missing branch.

22. The distributed storage management system of claim 15, wherein the missing branch is identified as a result of attempting to perform a read operation on behalf of a client of the cluster for a block ID in the respective range of block IDs of the missing branch.

* * * * *